United States Patent [19]

Cochran, Jr.

[11] Patent Number: 4,867,931

[45] Date of Patent: * Sep. 19, 1989

[54] METHODS FOR PRODUCING FIBER REINFORCED MICROSPHERES MADE FROM DISPERSED PARTICLE COMPOSITIONS

[75] Inventor: Joe K. Cochran, Jr., Marietta, Ga.

[73] Assignee: Materials Technology Corporation, Atlanta, Ga.

[*] Notice: The portion of the term of this patent subsequent to Jun. 9, 2004 has been disclaimed.

[21] Appl. No.: 827,441

[22] Filed: Feb. 10, 1986

[51] Int. Cl.[4] ............................ B29B 9/10; B29B 9/12
[52] U.S. Cl. ................................ 264/9; 65/21.4; 75/0.5 C; 264/5; 264/12; 264/43
[58] Field of Search ................... 264/9, 12, 42, 43, 44, 264/60, 5, 6; 65/21.4, 21.2, 18.1; 75/0.5 C

[56] References Cited

U.S. PATENT DOCUMENTS

| | | | |
|---|---|---|---|
| 4,059,423 | 11/1977 | De Vos et al. | 264/43 |
| 4,111,713 | 9/1978 | Beck | 106/288 B |
| 4,303,431 | 12/1981 | Torobin | 65/21.4 |
| 4,303,603 | 12/1981 | Torobin | 264/69 |
| 4,349,456 | 9/1982 | Sowman | 264/15 X |
| 4,415,512 | 11/1983 | Torobin | 264/9 |
| 4,671,909 | 6/1987 | Torobin | 264/43 |

Primary Examiner—Jan H. Silbaugh
Assistant Examiner—Mary Lynn Fertig
Attorney, Agent, or Firm—Perry Carvellas

[57] ABSTRACT

Fiber reinforced hollow microspheres made from dispersed particle film forming compositions including fibers, dispersed particles, a binder, a film stabilizing agent, a dispersing agent and a continuous liquid phase. Porous and non-porous fiber reinforced hollow microspheres can be made. The fiber reinforced hollow microspheres have walls with voids which are interconnected to each other and to the inner and outer wall surfaces, and the fiber reinforced hollow microspheres can be used as membrane substrates in selective separation processes and in biotech processes. The fiber reinforced hollow microspheres can be used as supports for catalysts and as enclosures for catalysts, adsorbents and absorbents. The fiber reinforced hollow microspheres can also be used as filler materials and as proppants for increasing gas recovery from gas wells. The fiber reinforced hollow microspheres are made by a process which includes forming a film of a fiber and dispersed particle film forming composition across a coaxial blowing nozzle, applying a blowing gas at a positive pressure on the inner surface of the fiber and dispersed particle composition film to blow the film and form an elongated cylinder shaped film of the fiber and dispersed particle composition. The cylinder shaped film is initially closed at its outer end, and as the cylinder shaped film progresses away from the coaxial nozzle, the film closes at its inner end, prior to the beginning of the formation of the next cylinder shaped film at the coaxial nozzle. The hollow fiber and dispersed particle composition microspheres are individually formed as they emerge from the coaxial nozzle. The blown microspheres form substantially spherical hardened fiber reinforced hollow green microspheres.

46 Claims, 5 Drawing Sheets

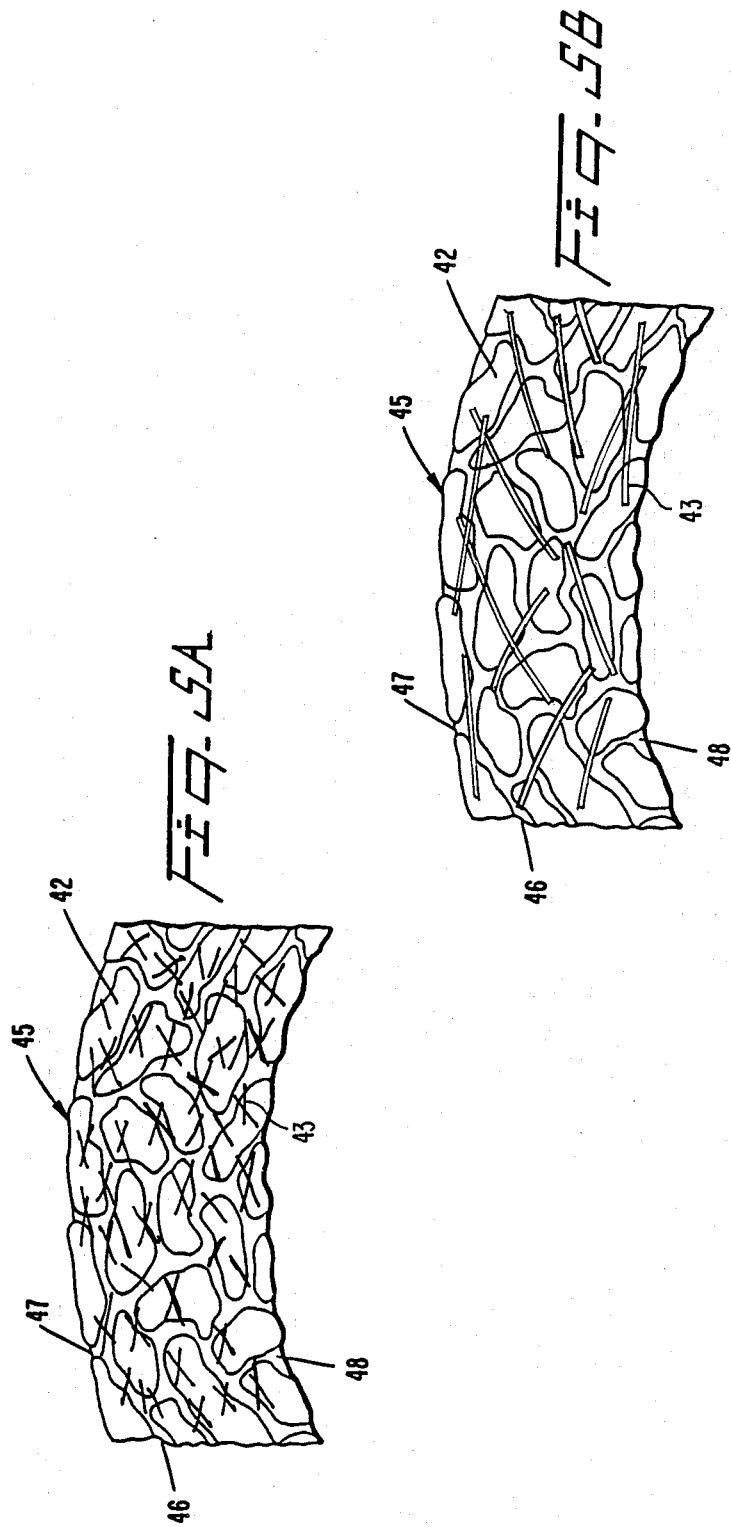

METHODS FOR PRODUCING FIBER REINFORCED MICROSPHERES MADE FROM DISPERSED PARTICLE COMPOSITIONS

The fiber reinforced hollow microsphere can be made from ceramic fibers, glass fibers, metal fibers, metal glass fibers and plastic fibers in admixture with dispersed ceramic particles, glass particles, metal particles, metal glass particles and plastic particles, and mixtures therof. The dispersed particles can be 0.05 to 20 microns in size. The reinforcing fibers can be one half to five microns in diameter and five to one hundred microns in length. Suitable fibers are silicon carbide, silicon nitride, carbon, graphite, glass, metals, metal glass fibers and fibers made from organic resins.

The hardened fiber reinforced hollow green microspheres obtained from the microsphere blowing step can be heated at elevated temperatures to remove the continuous liquid to sinter, adhere or otherwise bond the fibers to each other and to the sintered particles and to sinter the dispersed particles to form strong hollow porous microspheres. The fiber reinforced hollow porous microspheres can be treated with semipermeable membrane forming materials to make them non-porous and suitable for use in selective separation processes and in biotech processes, or the microspheres can be impregnated with liquids or gels and used in controlled release and membrane processes.

SUMMARY OF THE INVENTION

The apparatus of the Torobin U.S. Pat. No. 4,671,909 dated June 9, 1987, can be used to carry out the process of the present invention. The U.S. Pat. No. 4,671,909 is incorporated herein in its entirety by reference thereto.

The present invention relates to fiber reinforced hollow porous microspheres made from dispersed particle film forming compositions comprising reinforcing fibers and dispersed particles and one or more of binder, film stabilizing agent, dispersing agent and continuous liquid phase.

The present invention relates to fiber reinforced hollow green microspheres made from dispersed particle film forming compositions comprising reinforcing fibers and dispersed solid particles and one or more of a binder material, a film stabilizing agent, a dispersing agent for the solid particles and a continuous aqueous or nonaqueous liquid phase.

The present invention relates to fiber reinforced hollow green microspheres made from fibers and dispersed particle film forming compositions which hollow green microspheres are substantially spherical, have substantially uniform diameters and have substantially uniform wall thickness. The fiber reinforced hollow green microspheres are free of latent solid or liquid blowing gas materials, and the walls of the hollow green microspheres are substantially free of holes, relatively thinned wall portions or sections and bubbles.

The present invention particularly relates to rigid fiber reinforced hollow porous microspheres which are substantially spherical, have substantially uniform diameters, and have substantially uniform wall thickness and the walls have fibers uniformly distributed therein, fibers which are connected to each other and to the particles, have uniform void content and void distribution and have voids which are connected to each other and to the inner and outer microsphere wall surfaces. The walls of the hollow porous microspheres are free of latent solid or liquid blowing gas materials, and are substantially free of relatively thinned wall portions or sections and bubbles.

The fibers can be made from ceramic, glass, metal, metal glass, and plastic materials and mixtures thereof.

The particles can be made from ceramic, glass, metal, metal glass and plastic particles, and mixtures thereof.

The process of the present invention is carried out by using a coaxial blowing nozzle and a blowing gas to blow fiber reinforced hollow microspheres from a fiber and dispersed particle film forming composition comprising feeding the blowing gas to an inner coaxial nozzle, feeding the fibers and dispersed particle film forming composition to an outer coaxial nozzle, forming spherically shaped hollow microspheres in the region of the orifice of the coaxial blowing nozzle and removing the hollow microspheres from the region of the orifice of the coaxial blowing nozzle.

The process of the present invention can be carried out by using a coaxial blowing nozzle and an external fluctuating pressure field, e.g., a transverse jet entraining fluid and a blowing gas to blow fiber reinforced hollow microspheres from a fiber and dispersed particle film forming composition comprising applying the blowing gas to the inner surface of the film forming composition to continuously blow individual spherically shaped hollow microspheres and using the transverse jet entraining fluid to assist in the microsphere formation and the detaching of the hollow microspheres from the blowing nozzle.

The continuous liquid phase of the dispersed particle film forming composition allows the hollow microspheres to be blown by forming a stable film to contain the blowing gas while the hollow microsphere is being blown and formed.

The fibers and dispersed particles in the dispersed particle composition, as the dispersed particle composition is forming the hollow microsphere and after the microsphere is formed, link up with each other to form a rigid or relatively rigid lattice work of fibers and dispersed particles which fibers and dispersed particle lattice work with the binder and continuous liquid phase comprise the hollow green microspheres.

The reinforcing fibers can form a loose mat network and are evenly distributed between the dispersed particles that form the lattice work.

The fiber reinforced hollow green microspheres after they are formed can be hardened in ambient atmosphere or by heating and removing a portion of the continuous phase or by cooling where a thermoplastic binder is used. The hardened hollow green microspheres have sufficient strength for handling and further treatment without significant breaking or deforming of the microspheres.

The hardened fiber reinforced hollow green microspheres are treated at elevated temperatures to remove the remainder of the continuous liquid phase and volatile materials such as binder, film stabilizing agent and dispersing agent. The treatment at elevated temperatures sinters and coalesces the reinforcing fibers and dispersed solid particles to form rigid hollow porous microspheres that are substantially spherical in shape, have substantially uniform diameters have the fibers substantially uniformly distributed in the walls, and have substantially uniform wall thickness. The heating at elevated temperatures, in removing the continuous phase and added materials, other than the reinforcing fibers, creates interconnecting voids in the walls of the microspheres which result in the porous characteristics of the microspheres.

The reinforcing fibers are selected to be of a material which is not substantially deformed or chemically changed during the sintering step. The reinforcing fibers during the sintering step are sintered and/or can be slightly softened to sinter, adhere and/or otherwise bond them to each other and to the dispersed particles. The dispersed particles during the sintering step can be softened and/or melted to a small degree to wet the fibers and sinter the fibers and dispersed particles together.

The sintering and coalescing of the reinforcing fibers and dispersed solid particles, depending on the time and temperature of the heating step can cause a small degree of compaction of the fibers and dispersed particles and can cause the coalescing of the fibers and dispersed particles at the points in which they are in contact to form rigid, uniform size and shaped microspheres of uniform wall thickness, uniform fiber distribution in the walls, uniform void content and uniform distribution of voids in the walls and high tensile strength. Because the porosity is a result of the removal of the continuous phase from uniformly dispersed fibers and solid particles, the pores are continuous from the outer wall surface of the microsphere to the inner wall surface of the microsphere and the walls of the microspheres have substantially uniform void content and uniform distribution of the voids that are created.

The rigid fiber reinforced hollow porous microspheres of the present invention can be treated to impregnate the pores or place within the pores semipermeable membranes and the thus treated microspheres can be used in selective gas or selective liquid separation processes. The porous microspheres can also be treated to act as a substrate for or to contain a catalyst and be used for carrying out chemical processes.

The rigid fiber reinforced hollow porous microspheres of the present invention can be treated to encapsulate within the microspheres genetically engineered or natural living microorganisms. The microspheres containing the living organisms can be treated with nontoxic semipermeable membranes to seal the microsphere pores. The hollow porous microspheres may accordingly be used in conjunction with genetically engineered bacteria or other living microorganisms, antibiotics or enzymes in processes to produce or separate and purify pharmaceutical or chemical products.

The rigid fiber reinforced hollow porous microspheres of the present invention can be employed to encapsulate liquids or gels which are caused to be deposited into the internal hollow cavity of the microspheres by hydrostatic pressure or by centrifugal force. The liquids or gels can subsequently be used as adsorbents, absorbents or catalysts, or as slow release chemical agents.

BACKGROUND OF THE INVENTION

In recent years, there has developed many uses for hollow microspheres of uniform diameter, uniform wall thickness and uniform strength. Hollow microspheres have found industrial uses as filler materials and as proppants to increase gas recovery from gas wells. Though there are known methods for producing hollow microspheres the known methods do not suggest addition of fibers to substantially improve the tensile strength of the hollow porous microspheres.

The above mentioned copending Torobin U.S. Ser. No. 639,126, filed Aug. 9, 1984, discloses a method and apparatus for producing hollow porous microspheres, but does not disclose the addition of reinforcing fibers to the microspheres to improve the tensile strength of the microspheres.

The known methods for producing hollow porous microspheres include Sowman U.S. Pat. No. 4,349,456 (sol gel process), hollow multicel microspheres De Vos et al. U.S. Pat. No. 4,059,423 (latent blowing gas process), and hollow microspheres Beck, U.S. Pat. No. 4,111,713 (mechanical agglomeration). Beck incidently mentions the addition of glass fibers to the materials forming the hollow microspheres. Methods of forming hollow fused microspheres are disclosed in Torobin U.S. Pat. No. 4,303,431 (glass), Torobin U.S. Pat. No. 4,303,603 (plastic), and Torobin U.S. Pat. No. 4,415,512 (metal).

Prior to the time applicant made the present invention there was no known simple economical method of producing fiber reinforced hollow microspheres or fiber reinforced hollow porous microspheres where the microspheres were substantially spherical, of substantially uniform diameter and uniform wall thickness and where the microspheres had reinforcing fibers uniformly distributed in the walls of the microspheres.

OBJECTS OF THE INVENTION

It is an object of the present invention to provide a process for making fiber reinforced hollow porous microspheres from a fiber and dispersed particle film forming composition at about ambient or relatively low temperatures using a coaxial blowing nozzle and a blowing gas.

It is another object of the present invention to make fiber reinforced hollow green microspheres from a dispersed particle film forming composition comprising reinforcing fibers, dispersed solid particles, a binder material, a film stabilizing agent, a dispersing agent for the solid particles and a continuous aqueous or nonaqueous liquid phase.

It is another object of the present invention to make hollow green microspheres from a dispersed particle film forming composition comprising reinforcing fibers and dispersed ceramic particles, glass particles, metal particles, metal glass particles or plastic particles, and mixtures thereof.

It is another object of the present invention to use a coaxial blowing nozzle to blow a reinforcing fiber and dispersed particle film forming composition to form fiber reinforced hollow green microspheres which are spherical in shape, have uniform diameters and uniform thin walls and walls in which the fibers are substantially uniformly distributed, which walls are substantially free of trapped gas bubbles or dissolved latent blowing gases which can form bubbles and/or escape to form holes.

It is still another object of the present invention to produce from fiber and dispersed particle compositions in an economical simple manner fiber reinforced hollow porous microspheres which are substantially spherical in shape, uniform in size, wall thickness and have uniform and prescribed void content and uniform void distribution in the walls and have uniform distribution of fibers in the walls and which have substantially uniform high tensile strength.

It is another object of the present invention to make rigid fiber reinforced hollow porous microspheres for use as filler materials.

BRIEF DESCRIPTION OF THE DRAWINGS

The attached drawings illustrate exemplary forms of the method of the present invention for making fiber reinforced hollow microspheres from a fiber and disperse particle film forming composition and illustrate some of the hollow microspheres that are obtained.

The FIG. 1 of the drawings shows in cross-section an apparatus having a coaxial blowing nozzle means for supplying the fiber and dispersed particle composition material from which the hollow porous microspheres are formed and for supplying the gaseous material for blowing the hollow microspheres.

Figure 2:
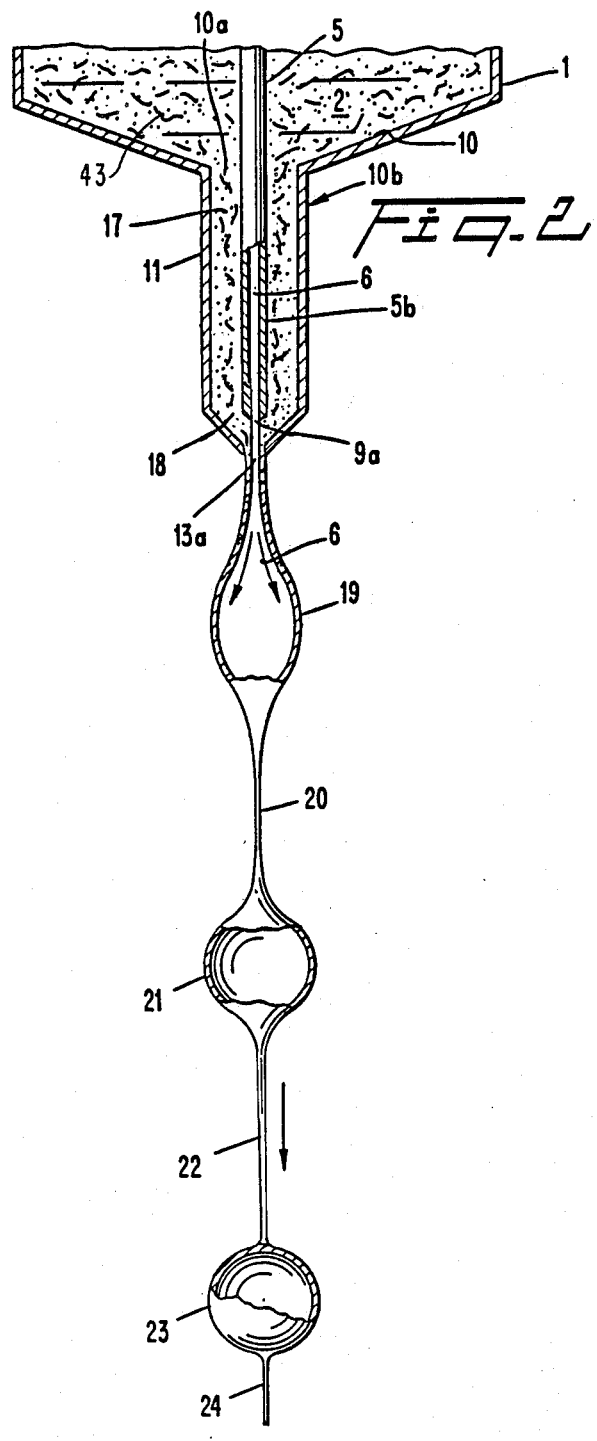

The FIG. 2 of the drawings is a detailed cross-section of a coaxial nozzle construction and shows the formation of filamented fiber reinforced hollow microspheres.

Figure 3:
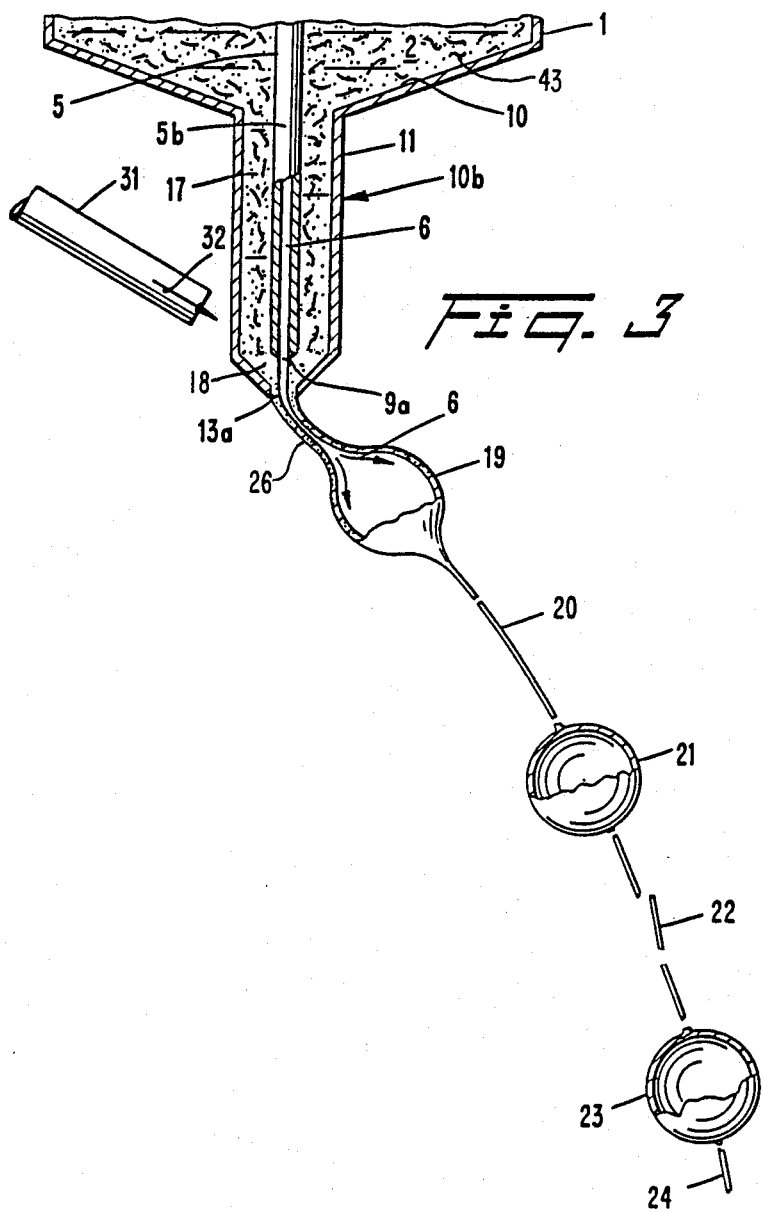

The FIG. 3 of the drawings is a cross-section of a coaxial nozzle construction of FIG. 2 used in conjunction with a transverse jet to assist in the formation and detachment of the hollow microspheres from the coaxial nozzle and shows the formation of filament microspheres and the breaking away of the filaments from the microspheres caused by the lateral fluctuations of the filaments induced by the transverse jet entraining fluid.

Figure 4A:
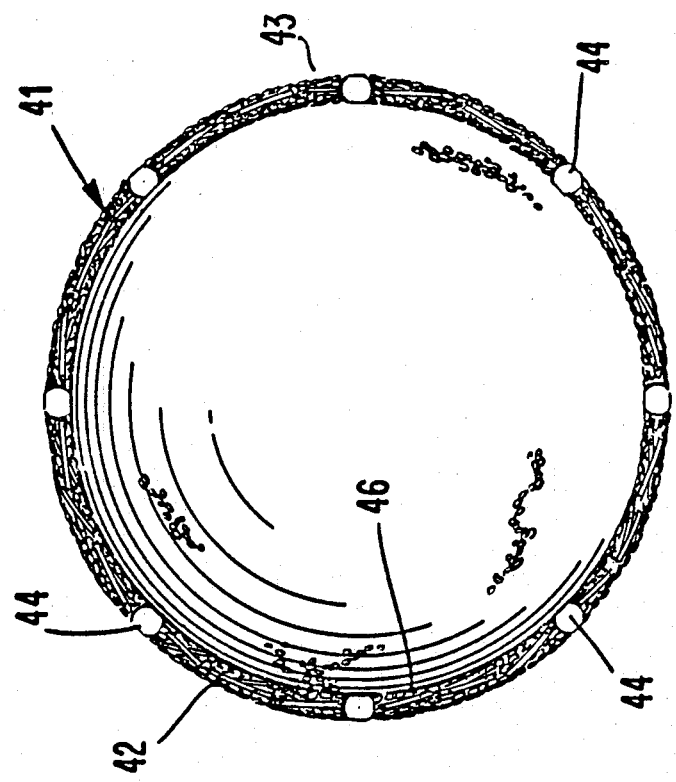

The FIG. 4A of the drawings is an enlarged cross-section of a hollow porous microsphere made from the fiber and dispersed particle compositions of the present invention and showing the fibers and interconnecting voids.

Figure 4B:
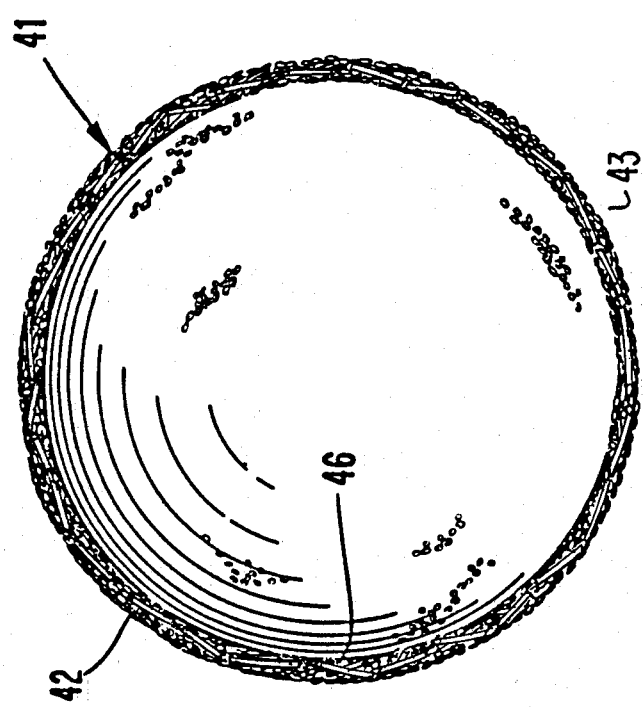

The FIG. 4B of the drawings is an enlarged cross-section of a hollow porous microsphere of the present invention showing the fibers and macro pores which extend through the walls and which are evenly distributed in the walls of the microsphere.

The FIG. 5A is an enlarged cross-section of a portion of the wall of a hollow microsphere made from the fiber and dispersed particle compositions showing relatively short fibers, e.g. about five microns in length, which microspheres have been heated at elevated temperature to remove the binder and continuous phase and sinter or otherwise bond the fibers to each other and to the particles and to sinter the dispersed particles.

The FIG. 5B is another cross-section of the microsphere section illustrated in FIG. 5A showing relatively long fibers, e.g. about twenty microns in length, which microspheres have been heated at elevated temperature to remove the binder and continuous phase and sinter or otherwise bond the fibers to each other and to the particles and to sinter the dispersed particles.

THE ADVANTAGES

The process of the present invention allows the production of fiber reinforced hollow green microspheres and rigid fiber reinforced hollow porous microspheres having predetermined characteristics of uniform diameter, uniform wall thickness and uniform void content, uniform distribution of fibers in the walls, uniform void distribution and void intercommunication in the walls and high tensile strength such that fiber reinforced hollow porous microspheres can be designed, manufactured and tailor made to suit a particular desired use.

The process of the present invention provides a practical and economical means by which fiber reinforced hollow green microspheres and fiber reinforced hollow porous microspheres having uniform diameters and uniform thin walls of high tensile strength can be produced. The process and apparatus of the present invention provide for the production of fiber reinforced hollow green microspheres and fiber reinforced hollow porous microspheres at economic prices and in large quantities.

DISCUSSION OF THE INVENTION

The invention will be described with reference to the accompanying Figures of the drawings wherein like numbers designate like parts throughout the several views.

Figure 1:
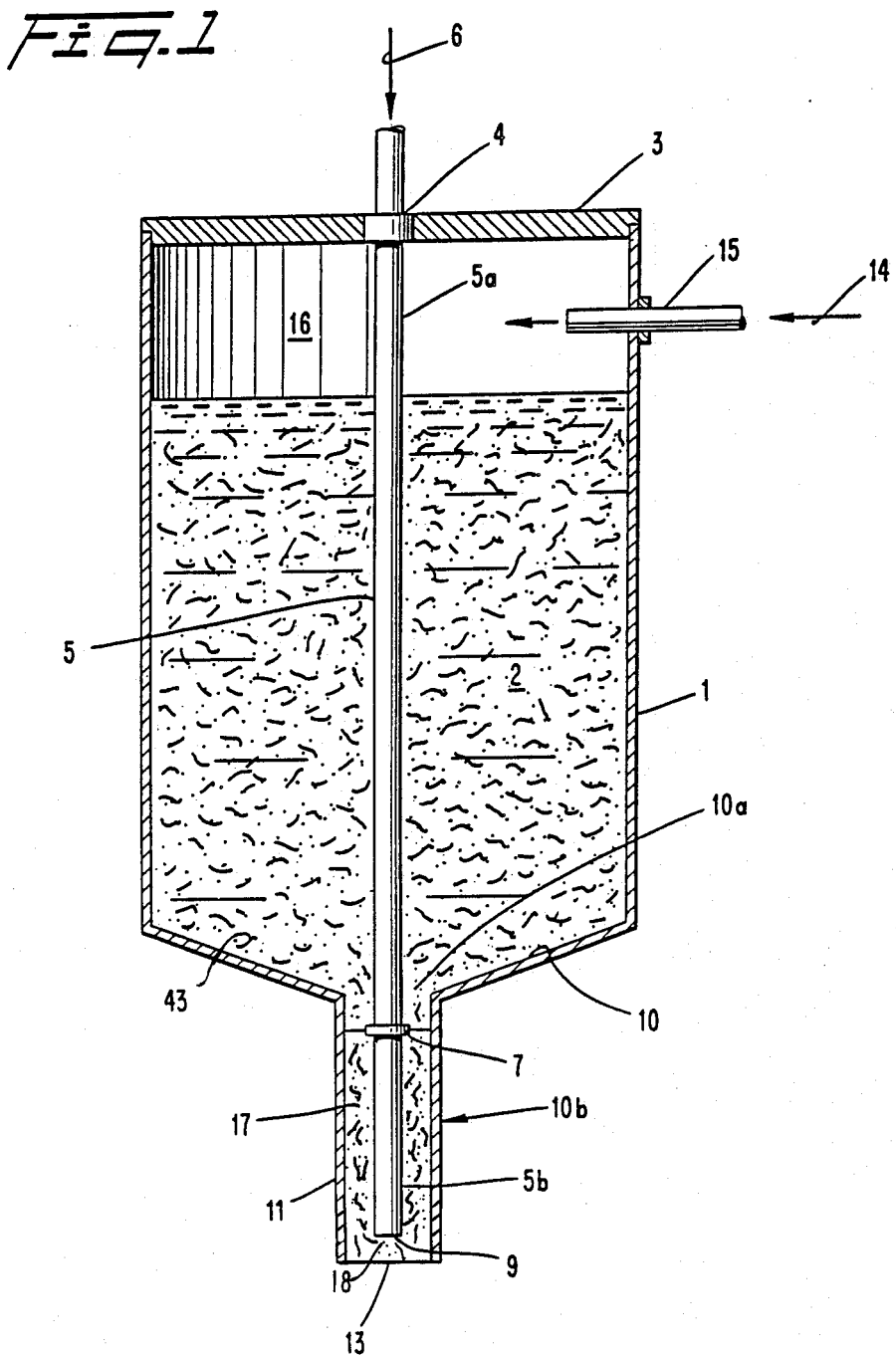

Referring to FIGS. 1 and 2 of the drawings there is illustrated a vessel 1, made of suitable non-corrosive material capable of being heated, by means not shown, and containing stirring or mixing means, also not shown, capable of maintaining the fibers and dispersed solid particles in the film forming composition 2 evenly dispersed throughout the continuous liquid phase of the composition in vessel 1.

The vessel 1 contains a removable lid 3 which may be removed to fill vessel 1 with a charge of fibers 43 and dispersed particle composition 2. The lid 3 contains a centered opening 4 through which a vertically moveable upper portion 5a of hollow tube 5 passes. The lower portion of hollow tube 5 forms the inner concentric blowing nozzle 5b for the blowing gas 6. The inner concentric blowing nozzle 5b, passes through vessel 1 and is centered by centering means 7.

The lower portion of inner coaxial nozzle 5b of the hollow tube 5 has an orifice opening 9 or 9a.

The bottom floor 10 of vessel 1 contains vertically disposed outer coaxial nozzle 11, which communicates with the inside of vessel 1 through opening 10a in the floor 10 of vessel 1.

The centering means 7 is connected to the inner wall surface of outer coaxial nozzle 11 and serves to center the inner coaxial nozzle 5b in outer coaxial nozzle 11.

The lower portion of outer nozzle coaxial 11 has an orifice opening 13 or 13a.

The blowing gas 6 is fed to vessel 1 through hollow tube 5. A positive pressure can be applied to the fiber and dispersed particle composition 2 by feeding a pressurizing gas 14 through conduit 15 into vessel 1 in the area 16 above the fiber and dispersed particle composition 2.

The blowing nozzle 10b consists of an inner nozzle 5b having an orifice 9 or 9a, for a blowing gas, and an outer nozzle 11 having an orifice 13 or 13a for the fiber and dispersed particle composition. The inner nozzle 5b is disposed and centered within and coaxial to outer nozzle 11 to form annular space 17 between nozzles 5b and 11, which annular space provides a flow path for the fiber and dispersed particle composition 2.

The orifice 9 or 9a can terminate a short distance above the plan of orifice 13 or 13a, respectively of outer nozzle 11. The cross section of annular space 17 of coaxial nozzle 10b is sufficiently large such that the fibers and particles in dispersed particle composition 2 flow freely through the annular space 17 without agglomerating or plugging.

The fiber and dispersed particle composition 2, at about atmospheric pressure or at an elevated pressure applied by introducing gas 14 to area 16 above fiber and dispersed particle composition 2 in vessel 1, flows downwardly through annular space 17 and fills the area between orifice 9 and 13, or 9a and 13a. The surface tension forces in the fiber and dispersed particle composition form a thin liquid film 18 across orifice 9 and 13 or 9a and 13a. The fibers as they pass through annular space 17 and orifice 13 and 13a become aligned such that they are disposed generally parallel to the walls of the microspheres as the microspheres are being formed.

A blowing gas 6 at about the temperature of the fiber and dispersed particle composition 2 and at a pressure slightly above the fiber and dispersed particle composition pressure at the blowing nozzle, is fed through hollow tube 5 and inner coaxial nozzle 5b and brought into contact with the inner surface of the film 18 of fiber and dispersed particle composition 2. The blowing gas 6 exerts a positive pressure on the fiber and dispersed particle composition film to blow and distend the film outwardly to form an elongated cylinder shaped liquid film 19 of fiber and dispersed particle composition filled with the blowing gas 6.

The elongated cylinder initially is closed at its outer end and is connected at its inner end to outer nozzle 11, at the peripheral edge of orifice 13 or 13a.

The continued feeding of fiber and dispersed particle composition 2 and blowing gas 6 to the coaxial nozzle 10b forms alternatively filaments 20, 22 and 24 and microspheres 21 and 23, respectively.

A balancing pressure of a gas, i.e., a slightly lower pressure, is provided in the area of the blowing nozzle 10b into which the elongated cylinder shaped 19 fiber and dispersed particle composition liquid film is blown.

The tapered nozzle apparatus illustrated in FIGS. 2 and 3 allows the use of larger inner diameters of outer nozzle 11 and larger inner diamaters of inner nozzle 5b, both of which reduce the possibility of plugging of the coaxial nozzle 10b when in use. The use of a larger inner diameter of outer nozzle 11 is of particular advantage when the dispersed particle composition contains relatively long fibers and/or relatively large dispersed solid and/or when the dispersed particle composition has relatively high or high viscosity.

FIG. 3 of the drawings illustrates another embodiment in which a transverse jet 31 is used to direct an inert entraining fluid 32 which is at about the same temperature as the fiber 43 and dispersed particle composition 2. The entraining fluid 32 is fed through transverse jet 31 and directed at the coaxial blowing nozzle 10b. The transverse jet 31 is aligned to direct the flow of entraining fluid 32 over and around the blowing nozzle 10b in the microsphere forming region at and behind orifice 13a. The entraining fluid 32 as it passes over and around blowing nozzle 10b fluid dynamically induces a pulsating or fluctuating pressure field in the entraining fluid 32 at the opposite or lee side of blowing nozzle 10b in its wake or shadow. The fluctuating pressure field induces regular periodic lateral oscillations of the cylinder 19 and connecting filaments similar to those of a flag flapping in a breeze.

The entraining fluid 32 envelops and acts on the elongated cylinder 19 during its formation in such a manner as to cause the cylinder 19 to flap, fold, pinch and close off at its inner end at point 26 proximal to the orifice 13a of outer nozzle 11. The continued movement of the entraining fluid 32 over the elongated cylinder 19 produces fluid drag forces on the cylinder 19 and detaches it from the orifice 13a of the outer nozzle 11 to allow the cylinder to be entrained and transported away from outer nozzle 11. The surface tension forces of the fiber and dispersed particle composition 2 act on the entrained falling elongated cylinder 19 and cause the cylinder to seek a minimum surface area and to as the spheres move away from outer coaxial nozzle 11 to become more and more spherically shaped hollow fiber and dispersed particle composition microspheres 21 and 23. The lateral fluctuations of the connecting filaments incudes by transverse jet entraining fluid act on the filaments to cause the filaments to break up.

The microspheres 21 and 23 as they are formed rapidly harden to form fiber reinforced hollow green microspheres. The filaments 20 and 22 also rapidly harden and due to the induced fluctuating pressure field can be broken away from the microspheres 21 and 23 as illustrated in FIG. 3.

In the FIGS. 1 to 3 embodiments of the invention heating means (not shown) for removing a portion of the continuous phase or cooling means (not shown) where a thermosetting binder phase is used can be disposed below the coaxial blowing nozzle 10*b* to rapidly heat, remove continuous liquid phase and harden the fiber reinforced hollow microspheres. The fiber reinforced hollow green microspheres can then be heated and fired at elevated temperatures to remove the continuous liquid phase and added binder, film stabilizing agent and dispersing agent and to sinter or otherwise bond the fibers to each other and to the dispersed particles and to sinter the dispersed solid particles at the dispersed particles points of contact to form high tensile strength, uniform diameter, fiber reinforced hollow microspheres of uniform wall thickness, uniform distribution of fibers in the walls and uniform void content and uniform void distribution in the walls of the microspheres.

The dispersed sintered particles define interconnecting voids in the hollow microsphere walls which are continuous and extend from the outer wall surface to the inner wall surface of the hollow microsphere.

In the FIGS. 2 and 3 of the drawings the fiber reinforced hollow microspheres are connected to each other by thin filaments. As can be seen in the drawings, as the microspheres progress away from coaxial nozzle 10*b* surface tension forces act on the forming hollow microspheres to effect the gradual change of the elongated shaped forming microsphere into the generally spherical shape microsphere 21 and more spherically shaped microsphere 23.

There is a gradual reduction in the diameter of the connecting filaments 20, 22 and 24, as the distance between the microspheres and the blowing nozzle 10*b* increases. The fiber reinforced hollow microspheres 21 and 23 are connected by thin filaments 20 and 22 which, as they progress away from the blowing nozzle 10*b*, become of substantially equal length and are continuous with the microspheres. The addition of the reinforcing fibers to the film forming composition act to generally strengthen the connecting filaments.

In the FIG. 2 embodiment the filaments are or can be broken away from the microspheres by use of external fluid jets or at such time as the microspheres are collected, e.g., on a fluidized bed or solid support.

FIG. 4A of the drawings is an enlarged cross section of a fiber reinforced hollow porous microsphere 41 having an about twenty micron wall thickness made in accordance with the present invention. The microsphere illustrated is shown after firing at elevated temperature and shows fibers 43, dispersed particles 42 and the interconnecting voids 46.

The FIG. 4B of the drawings is an enlarged cross section of a hollow porous microspheres 41 having an about twenty micron wall thickness, made in accordance with an embodiment of the invention showing reinforcing fibers 43, dispersed particles 42 and interconnecting voids 46 and large uniform macro size pores 44 of a predetermined about twenty micron size. In order to obtain the desired size macro pores 44 there is added to the dispersed particle composition and distributed throughout the composition a small proportion of combustible, vaporizable or meltable macro particles. The combustible, vaporizable or meltable particles are seleccted so that they are burned, vaporize or melt at temperatures below the melting temperatures of the dispersed solid particles, but at temperatures above the blowing temperatures.

The FIGS. 5A shows an enlarged detailed cross section 45 of a portion of a hollow porous microsphere wall about twenty microns thick and containing uniformly dispersed therein reinforcing fibers about one micron in diameter and about five microns in length after it has been fired at an elevated temperature and after the continuous liquid phase has been removed. The firing is carried out at temperatures at about or below the melting temperature of the reinforcing fibers 43 and below the melting temperature of the dispersed particles 42. The reinforcing fibers during the sintering step are sintered and/or can be slightly softened to sinter, adhere and/or otherwise bond them to each other and to the dispersed particles. The dispersed particles during the sintering step can be softened and/or melted to a small degree to wet the fibers and sinter the fibers and dispersed particles together. The fibers become sintered or otherwise bonded to each other and to the particles and the dispersed particles become sintered together at their points of contact to form strong bonds and a strong uniformly thick microsphere wall. In firing at elevated temperatures the remaining continuous liquid phase and additive materials or agents are vaporized and leave pores 47 at the outer surface of the microsphere wall which pores extend by interconnecting voids 46 through the wall 45 of the microsphere to the inner wall surface pore 48 of the microsphere. The reinforcing fibers 43 are deposited and adhere to the surfaces of the particles that form the interconnecting voids 46. The fibers are deposited between the dispersed particles to form a mat of fibers. The reinforcing fibers 43 increase the surface area of support in the pores in those embodiments in which it is desired to deposit, impregnate or otherwise place a permeable, a semipermeable membrane or a catalyst in the interconnecting voids and/or on the outer pore area of the microsphere wall.

The FIG. 5B also shows an enlarged detailed cross-section 45 of a portion of a hollow porous microsphere wall about twenty microns thick. The wall of the microsphere contains uniformly dispersed therein reinforcing fibers about two microns in diameter and about twenty microns in length after the microsphere has been fired at an elevated temperature and after the continuous liquid phase has been removed. The firing as before removes the continuous liquid phase and binder. The fibers as before become sintered or otherwise bonded to each other and to the dispersed particles and the dispersed particles become sintered together.

APPARATUS

The apparatus described in the copending Torobin U.S. application Ser. No. 639,126, filed Aug. 9, 1984, can be used to carryout the process of the present invention.

Referring to FIG. 1 of the drawings, the vessel 1 is constructed to be heated or cooled, by means not shown, and is provided with stirring means, not shown, which stirring means maintains the fibers and the particles in the dispersed particle composition 2 evenly dispersed throughout the composition 2. The coaxial blowing nozzle 10b consists of an inner nozzle 5b and an outer nozzle 11. The inner nozzle 5b and outer nozzle 11 form annular space 17. The distance between the inner wall of nozzle 11 and the outer wall of nozzle 5b is selected such that it is large enough to prevent plugging of the nozzle and to prevent any significant compaction of the reinforcing fibers and the dispersed solid particles, such that the viscosity of the fiber and dispersed particle composition is not significantly changed in passing through coaxial nozzle 10a.

The fiber and dispersed particle composition 2 is extruded through a gap formed between the outer edge of orifice 9 of inner nozzle 5b and the inner surface of the inner wall of outer nozzle 11, or the inner edge of orifice 13a of outer nozzle 11 (FIG. 2) whichever is smallest. The minimum size of the gap used is determined to some extent by the diameter and length of the reinforcing fibers and the size of the dispersed solid particles, and is set large enough to prevent plugging of the nozzle. The size of the gap used is set such that the desired wall thickness of the microspheres being blown and the desired diameter of the microspheres being blown is obtained.

In FIGS. 1, 2 and 3 the orifice 9 of inner nozzle 5b can terminate at about the plane or a short distance above the plane of orifice 13 of outer nozzle 11.

In the FIG. 2 embodiment relatively lower viscosities and relatively higher blowing gas feed rates tend to produce non-filamented microspheres and relatively higher viscosities and relatively lower blowing gas feed rates tend to produce filamented microspheres.

The outside diameter of coaxial nozzle 10a is not important, except in the FIG. 3 embodiment which utilizes a transverse jet entraining fluid. The transverse jet FIG. 3 embodiment has distinct process advantages over the use of a simple coaxial blowing nozzle. The transverse jet provides a controlled means for individually sealing off each microsphere at the nozzle orifice when the microsphere formation is complete. The transverse jet also provides a controlled means for rapidly removing and transporting the formed microsphere away from the nozzle orifice which allows reduction of the mass of the connecting filaments and substantial removal or prevention of thickened wall portions at the points of connection of the filaments. The transverse jet also provides controlled means, depending on the viscosity of the dispersed particle composition, e.g., low viscosities, and the linear velocity of the transverse jet entraining fluid in the area of microsphere formation, e.g., high linear velocity, for the elimination of the connecting filaments, i.e., the filaments are rapidly thinned and broken and the remaining portions of the filaments by surface tension forces are caused to flow back into the formed microsphere and be evenly distributed in the wall of the microspheres.

The coaxial nozzle 10b, i.e., inner nozzle 5b and outer nozzle 11, can be made from stainless steel, platinum alloys, glass or fused alumina. Stainless steel, however, is a preferred material.

In the FIG. 3 embodiment, the transverse jet 31 is aligned to direct the flow of entraining fluid 32 over and around outer nozzle 11 in the microsphere forming region of orifice 13a on the lee side of outer nozzle 11 (coaxial nozzle 10b). The center axis of transverse jet 31 is aligned at an angle of 15° to 85°, preferably 25° to 75° and more preferably 35° to 55° relative to the center axis of the coaxial blowing nozzle 10b.

In FIGS. 2 and 3 the proper gap between the outer edge of orifice 9 and the inner edge of orifice 13 can best be determined for a particular fiber and dispersed particle composition by extending downward the inner nozzle 5b a sufficient distance and/or with sufficient pressure to completely block-off the flow of dispersed particle composition, and to then while feeding blowing gas through inner nozzle 5b, very slowly raise the inner nozzle 5b until a stable system is obtained, i.e., until the hollow microspheres are being formed.

PROCESS CONDITIONS

The fiber and dispersed particle compositions can be blown into hollow microspheres at temperatures of about 10° C. to 300° C., preferably 18° C. to 200° C. and more preferably 18° C. to 100° C.

For example, the dispersed particle compositions can be blown into microspheres at about ambient temperatures, e.g., 18° to 28° C.

The fiber and dispersed particle compositions are maintained in a liquid, fluid form at the desired blowing temperature during the blowing operation.

The fiber and dispersed particle compositions at the blowing temperature are fluid and flow easily. The dispersed particle composition just prior to the blowing operation can have a viscosity of 10 to 600 poises, preferably 20 to 350 and more preferably 30 to 200 poises.

Where the process is used to make non-filamented microspheres, e.g., using the transverse jet embodiment, the fiber and dispersed particle composition just prior to the blowing operation can have a viscosity of 10 to 200 poises, preferably 20 to 100 poises, and more preferably 25 to 75 poises.

Where the process is used to make filamented microspheres, the fiber and dispersed particle composition just prior to the blowing operation can have a viscosity of 50 to 600 poises, preferably 100 to 400 poises, and more preferably 150 to 300 poises.

The fiber and dispersed particle compositions fed to the blowing nozzle can be at about ambient pressure or can be at slightly elevated pressures sufficient to provide an adequate amount of fiber and dispersed particle composition at the coaxial blowing nozzle to form the microspheres.

The fiber and dispersed particle composition is continuously fed to the coaxial blowing nozzle during the blowing of the microsphere to prevent premature breaking and detaching of the elongated cylinder shaped fiber and dispersed particle composition liquid film as the microsphere is being formed by the blowing gas.

The pressure of the blowing gas in sufficient to blow the microsphere and will be slightly above the pressure of the fiber and dispersed particle composition at the orifice 13 of the outer nozzle 11. The blowing gas pressure will also depend on and be slightly above the ambient pressure external to the blowing nozzle.

The ambient pressure external to the blowing nozzle can be at about atmospheric pressure or can be at slightly elevated pressures. The ambient pressure external to the blowing nozzle will, in any event, be such that it substantially balances, but is slightly less than the blowing gas pressure.

In the embodiment of the invention illustrated in FIG. 3 of the drawings, the transverse jet inert entraining fluid which is directed over and around the coaxial blowing nozzle to assist in the formation and detaching of the hollow dispersed particle composition microspheres from the coaxial blowing nozzle can be at about the temperature of the fiber and dispersed particle composition being blown.

The transverse jet entraining fluid which is directed over and around the coaxial blowing nozzle to assist in the formation and detaching of the fiber reinforced hollow dispersed particle composition microsphere from the coaxial blowing nozzle can have a linear velocity in the region of microsphere formation of 1 to 120 ft/sec (0.3 to 3.0 m/sec), preferably 5 to 8 ft/sec (1.5 to 24 m/sec) and more preferably 10 to 60 ft/sec (3.0 to 18 m/sec).

Where the process is used to make non-filamented microspheres, the linear velocity of the transverse jet entraining fluid in the region of microsphere formation can be 30 to 120 ft/sec (12 to 37 m/sec), preferably 40 to 100 ft/sec (12 to 30 m/sec), and more preferably 50 to 80 ft/sec (15 to 24 m/sec).

Where the process is used to make filamented microspheres, the linear velocity of the transverse jet entraining fluid in the region of microsphere formation can be 1 to 50 ft/sec (0.3 to 15 m/sec), preferably 5 to 40 ft/sec (1.5 to 12 m/sec) and more preferably 10 to 30 ft/sec (3.0 to 9.0 m/sec).

The distance between the filamented microspheres depends to some extend on the viscosity of the dispersed particle composition and the linear velocity of the transverse jet entraining fluid.

The fiber reinforced hollow dispersed particle composition microspheres after formation may be contacted with heated air to assist in removal of continuous liquid phase and drying and hardening the microspheres, e.g., when an aqueous or volatile solvent continuous phase is used. The fiber reinforced microspheres after they are formed to assist in removal of continuous liquid phase can be dropped through a heated "shot tower" and collected at the bottom of the tower in a liquid bath or on an air cushion.

The hollow fiber reinforced microspheres after formation may be contacted with a quench fluid, e.g., cooled air or an immiscible liquid spray to assist in hardening the microspheres, e.g., when a thermoplastic binder is used. The hardened microspheres can be collected on an air cushion, moving belt or in a fluidized be.

The fiber reinforced hollow green microspheres can optionally be treated by additional drying at slightly elevated temperatures to cure, further harden and further strengthen the binder.

Where an aqueous or volatile solvent continuous liquid phase is used the further treatment can be carried out at a temperature of 40° to 200° C., for 0.5 to 10 minutes, preferably 60° to 140° C., for 1.0 to 8.0 minutes and more preferably at a temperature of 80° to 120° C. for 2.0 to 6.0 minutes.

The fiber reinforced hardened hollow green microspheres are then treated or fired at substantially elevated temperatures to remove the continuous liquid phase and volatile materials from the hollow microspheres.

The firing at elevated temperatures removes, for example, the binder, surface active agent, dispersing agent and remaining continuous liquid phase from the interstices between the reinforcing fibers and the dispersed solid particles in the fiber and dispersed particle composition from which the microspheres were formed and creates the porous characteristics of the fiber reinforced hollow microspheres. Because continuous phase and for example the binder fill the interstices between the fibers and particles in the fiber and dispersed particle composition the removal of the continuous phase and binder result in obtaining interconnecting voids in the walls of the fiber reinforced hollow microspheres which are continuous from the outer wall surface of the hollow microspheres through and extending to the inner wall surface of the fiber reinforced hollow microspheres.

The reinforcing fibers during the sintering step are sintered and/or slightly softened to sinter, adhere and/or otherwise bond them to each other and to the dispersed particles. The dispersed particles during the sintering step can be softened and/or melted to a small degree to wet the fibers and sinter the fibers and dispersed particles together.

The firing of the microspheres causes the reinforcing fibers to sinter or otherwise bond to each other and to the particles and causes the particles to sinter at the points of contact of the particles with each other such that the fibers and particles coalesce to form a strong rigid latticework fiber reinforced hollow microsphere wall.

The temperature at which the treatment or firing at elevated temperature is carried out depends on the particular material comprising the fibers and dispersed solid particles. The treatment or firing temperature is at about or below the melting temperature of the material comprising the reinforcing fibers and the material comprising the dispersed solid particles and below the temperature that would destroy the structural configuration of the fiber or would cause collapse of the hollow microspheres. Where metal glass fibers or particles are used to form the fibers and/or dispersed particles, the firing temperature is below devitrification temperature of the metal glass fibers and/or particles.

The time-temperature relationship of the firing step is such that the continuous phase and binder are heated and removed while at the same time the microsphere is gaining strength from the fibers and dispersed particles sintering and becoming adhered together at their points of contact.

The time-temperature relationship of the firing and sintering step will also depend to some extent on the wall thickness of the microspheres and the weight percent or volume percent solids of the fibers and dispersed solid particles in the continuous liquid phase.

The microspheres are heated at a rate such as to allow time for the permeation and removal of the volatile constituents of the continuous phase and the binder material through the pores of the walls of the microspheres without cracking or breaking the walls of the microspheres, or trapping any bubbles in the walls of the microspheres.

In the fiber and dispersed particle compositions where ceramic materials comprise the fibers and/or dispersed particles, the firing step can, for example, be carried out at temperatures of 800° to 2000° C., for 0.5 to 180 minutes.

In the fiber and dispersed particle compositions where glass fibers and/or glass particles comprise the fibers and/or dispersed particles, the firing step can, for example, be carried out at temperatures of 600° to 1600° C., for 0.5 to 120 minutes.

In the fiber and dispersed particle compositions where metal fibers and/or metal particles comprise the fibers and/or dispersed particles, the firing step can, for example, be carried out at temperatures of 150° to 1600° C., for 0.5 to 120 minutes.

In the fiber and dispersed particle compositions where metal glass fibers and/or metal glass particles comprise the fibers and/or dispersed particles, the firing step can, for example, be carried out at temperatures of 150° to 1200° C., for 0.5 to 60 minutes.

In the fiber and dispersed particle compositions where plastic fibers and/or particles comprise the fibers and/or dispersed particle composition, the firing step is carried out at temperatures at about or below the melting and below the decomposition temperatures of the plastic fibers and plastic particles. The firing step can, for example, be carried out at temperatures of 60° to 300° C., for 0.5 to 60 minutes.

The above mentioned firing temperatures and firing times for the various mentioned fibers and dispersed particles are given only as illustrative and higher or lower temperatures and longer or shorter firing times can be used as required.

An important feature of the process is that under a specified set of operating conditions each microsphere as it is formed is of substantially the same size, shape, diameter and wall thickness, same fiber content and the same porosity, i.e., void content and void distribution, as the preceding and following microspheres.

BLOWING GAS

The fiber reinforced hollow dispersed particle composition microspheres can be blown with a reactant gas or an inert gas. Suitable blowing gases are argon, xenon, carbon dioxide, oygen, hydrogen, nitrogen and air. The blowing gases are preferably dried before use.

The blowing gas can be selected to assist in the hardening of the fiber and dispersed particle composition, for example, by dehydrating the blowing gas to assist in drying. The blowing gas can be heated to assist in drying the fiber reinforced hollow microspheres.

DISPERSED PARTICLES COMPOSITION

The dispersed particle film forming compositions of the present invention can comprise fibers, dispersed particles, a binder, a film stabilizing agent, a dispersing agent and a continuous liquid phase.

The continuous liquid phase can be aqueous or non-aqueous and may act as a solvent for the binder material, film stabilizing agent and dispersing agent. Aqueous continuous liquids include water and non-aqueous continuous liquids include conventional organic solvents.

The fiber and disperse particle composition can contain constituents which naturally form a stable thin film and stable thin film wall hollow microsphere. However, if such is not the case a film stabilizing agent is added. The conventional foam stabilizing agents can be used as film stabilizing agents.

The fiber and dispersed particle composition may naturally form a stable dispersions of fibers and particles. Whether or not this occurs depends to some extent on the fiber diameter and length, dispersed particle size and the affinity of the fibers and dispersed particles for the continuous liquid phase and the presence of residual charges on the fibers and particles' surfaces. Usually a dispersing agent is added, particularly where the fibers are relatively long, e.g. above 5 microns and where the particles are relatively large, e.g., above 0.10 micron.

The reinforcing fibers can be made from ceramic, glass, metal, metal glass and plastic materials.

The dispersed particles can be ceramic particles, glass particles, metal particles, metal glass particles and plastic particles.

REINFORCING FIBERS

The reinforcing fibers can be selected from a wide variety of materials which include ceramic materials, glasses, metals, metal glasses and plastics (e.g. organic resins).

The relationship between the fiber diameter and length and relationship to the wall thickness of the fiber reinforced microspheres are presented in the following Table I.

TABLE I

| Reinforcing Fibers | | | |
|---|---|---|---|
| | Broad | Preferred | More Preferred |
| Diameter (microns) | 0.5 to 10 | 0.5 to 5 | 0.5 to 3 |
| Length (microns) | 2 to 500 | 5 to 100 | 5 to 20 |
| Ratio D/L | 1:3 to 1:100 | 1:5 to 1:50 | 1:10 to 1:20 |
| Ratio Length to Microsphere Wall Thickness | 1:10 to 10:1 | 1:5 to 5:1 | 1:5 to 2:1 |

Ceramic Fibers

The ceramic materials from which the reinforcing fibers can be made include silicon carbide, silicon nitride, carbon, graphite and aluminum oxide.

The silicon carbide fibers are available in diameters of 0.5 to 10.

The silicon nitride fibers are available in diameters of 1 to 10.

The carbon fibers are available in diameters of 5 to 8 microns.

The aluminum oxide fibers are available in diameters of 1 to 10 microns.

The fibers throughout their length have uniform diameters.

The fibers can be cut to the desired lengths by conventional means, e.g. pumping a fiber slurry through a refiner or by ball milling or rod milling.

Other ceramic materials that can be used to make fibers are berillium oxide, boron carbide, zirconium oxide and boron nitride.

Glass Fibers

The glass materials from which the reinforcing fibers can be made include the glass compositions conventionally used to make fiber glass insulation. The fiber glass insulation is available in diameters of 0.5 to 10 microns and in lengths of 0.5 to 6 inches.

The glass fiber materials that can be used include those disclosed in the Torobin U.S. Pat. No. 4,363,646, the entire disclosure of which is incorporated herein by reference. These fibers can be made in diameters of 0.5 to 30 microns and in lengths of 0.5 to 6 inches. The fibers can be cut to the desired length by conventional means.

Other glass fiber materials that can be used are fused silica, "E" Glass, "D" Glass, "S" Glass and a variety of other commercial glass compositions.

Metal Fibers

The metal fiber materials from which the reinforcing fibers can be made include steel, nickel, gold, copper, tungsten, chromium and iron.

The metal and metal glass fiber materials that can be used include those disclosed in the Torobin U.S. Pat. No. 4,525,314, the entire disclosure of which is incorporated herein by reference. These fibers can be made in diameters of 0.5 to 30 microns and in lengths of 0.5 to 6 inches. The fibers can be cut to the desired lengths by conventional means.

Plastic Fibers

The plastic fiber materials that can be used are made from organic resins and/or polymers and can include Nylon, Rayon and Orlon.

Other plastic fiber materials that can be used include those disclosed in the Torobin U.S. Pat. No. 4,536,361, the entire disclosure of which is incorporated herein by reference. These fibers can be made in diameters of 0.5 to 30 microns and in lengths of 0.5 to 6 inches. The fibers can be cut to the desired length by conventional means.

The reinforcing fibers that are used are of substantially the same uniform diameter. The lengths, however, will vary and a relatively wide length size or a relatively narrow length size distribution of fibers can be used.

DISPERSED PARTICLES

The dispersed particles can be selected from a wide variety of materials and can include ceramic materials (including graphite and metal oxides), glasses, metals, metal glasses and plastics, and mixtures thereof.

The dispersed particles can be 0.005 to 60 microns in size, preferably, 0.05 to 20 and more preferably 0.1 to 10 microns in size. Generally a relatively narrow particle size distribution of particles are used.

The fiber and dispersed particle compositions can comprise the following ingredients in volume percent based on solid content and volume percent based on total composition. The macro particles may or may not be included depending on whether or not it is desired that macro pores be obtained.

TABLE II

| | Volume Percent | | |
|---|---|---|---|
| | Broad | Preferred | More Preferred |
| Fibers (Vol. % of System) | (2.5–10) | (5–10) | (7.5–9.5) |
| Fibers (Vol. % of Solids) | (5–30) | (10–20) | (15–20) |
| Dispersed Particles (Vol. % of System) | (30 to 50) | (35 to 45) | (40 to 45) |
| Dispersed Particles (Vol. % of Solids) | (70 to 95) | (80 to 90) | (80 to 85) |
| Macro Particles (Vol. % Solids) | (0.5 to 20) | (1 to 10) | (2 to 6) |
| Continuous Liquid Phase (Vol. % of System) | 30 to 70 | 40 to 60 | 40 to 50 |
| Binder Material (Vol. % Solids) | 0 to 35 | 0.1 to 10 | 0.1 to 6 |
| Film Stabilizing Agent (Vol. % Solids) | 0 to 2.0 | 0.05 to 1.5 | 0.1 to 1.0 |
| Dispersing Agent (Wt. % Solids) | 0 to 2.0 | 0.05 to 1.5 | 0.1 to 1.0 |

The volume percent of fibers and the volume percent solids in the dispersed particle composition are important parameters of the composition.

Where more than about 10% by volume of fibers, based on the volume of the entire system are used the properties of the dispersed particle composition are adversely affected. This adverse effect is dependent to some extent on the total volume of solids in the composition and on the fiber length. If short fiber lengths are used, e.g. 5 to 10 microns and if the total volume of solids in the system is about 40 to 50 percent by volume then in some systems as much as 10 to 15 volume percent of fibers can be used. Generally it is preferred that the volume percent of fibers, based on total volume of the composition not exceed about 10% by volume.

Where less than about 2.5% by volume of fibers based on total solids in the composition are used there is little or no improvement obtained in the tensile strength of the fiber reinforced microspheres.

The optimum tensile strength is obtained, depending on the constituents of the composition and fiber diameter and length, by adding about 15 to 25% by volume fibers, based on volume of total solids in the fiber and dispersed particle composition.

MACRO PARTICLES

In accordance with an embodiment of the invention macro pore openings of predetermined uniform and precise size can be obtained. This is done by uniformly mixing with the fiber and dispersed particle composition uniform size macro particles.

The macro particles are selected to be of uniform size and generally spherically or spheroid in shape with preferably smooth wall surfaces. The particles are generally solid and made from combustible, decomposable, vaporizable or meltable materials. The macro particle material is selected such that it remains solid at the blowing and microsphere hardening temperatures and is removed at temperatures above the blowing temperatures and below the temperatures at which the microsphere firing and sintering step is carried out. Suitable materials for use as macro particles are naphthalene, anthracene, camphor, polyformaldehyde resins, and polyethylene, polypropylene and nylon beads or pellets. Various organic polymeric materials that meet the above criteria can also be used.

The macro particle size is selected to be about the same or slightly larger in size than the thickness of the wall of the microsphere in which it is to create uniform size macro pores. Thus in microspheres having wall thickness of for example 10 to 200 microns, the macro particles would be about 10 to 200 microns in size, e.g., slightly larger than the wall thickness. The diameter of the macro pore can of course be made larger than the thickness of the microsphere wall if such is desired. The macro particles can be about 0.8 to 4.0 times the thickness of the microsphere wall, preferably the macro particles are 1.1 to 2.0 times the thickness of the microsphere wall, and more preferably the macro particles are 1.1 to 1.5 times the thickness of the microsphere wall. The macro particles may be added to the dispersed particle composition in an amount of about 0.50 to 20%, preferably 1 to 10% and more preferably 2 to 6% of the dispersed particles plus macro particles volume. The macro pores can be obtained, particularly with the fiber reinforced microspheres, without significant weakening of the microsphere wall.

CERAMIC PARTICLES

The ceramic material from which the dispersed particles can be made are generally those that are presently known and used in the ceramic industry. Other ceramic materials, including metal oxides, that can be used as starting materials for the present invention are disclosed in Sowman U.S. Pat. No. 4,349,456. The selection of a particular ceramic material will depend on the desired properties of the hollow microspheres, the ease of processing and the availability and cost of the ceramic material or metal oxide material. For certain uses graphite particles can be used as the dispersed particle ceramic material.

The conventionally used ceramic materials such as Alumina ($Al_2O_3$), Mullite ($3Al_2O_3 \cdot SiO_2$), Cordierite ($2MgO \cdot 2Al_2O_3 \cdot 5SiO_2$), Zircon ($ZrO_2 \cdot SiO_2$), and Zirconia ($ZrO_2$) can be used. Naturally occurring clay materials such as Kaolinite, montmorillonite, illite and bentonite can also be used. The ball clay materials can also be used. Where appropriate the ceramic materials can be ground or otherwise treated to obtain a desired particle size.

A preferred material is alumina ($Al_2O_3$) sold by Alcoa Aluminum Co. under the trade name of "A-16" and "A-17". The A-16 and A-17 trade names designate two grades of alumina differing slightly in purity and particle size.

The particle size and particle distribution of a commercially available alumina suitable for use as dispersed particle materials is as follows:

| Size Range (microns) | Fraction Within Size | Effective Size (microns) |
| --- | --- | --- |
| 0–0.1 | 0.08 | — |
| 0.1–0.3 | 0.28 | 0.20 |
| 0.30–0.6 | 0.43 | 0.45 |
| 0.6–1.0 | 0.15 | 0.80 |
| 1.0–1.5 | 0.05 | 1.25 |
| 1.5–3.0 | 0.03 | 2.0 |

The heating to fire and sinter the ceramic particles is carried out at elevated temperatures sufficient to cause the fibers to sinter or otherwise bond to each other and to the particles and the particles to sinter together at their points of contact and will depend on the properties of the particular fibers and ceramic materials used. Where materials such as graphite are fired they are fired in a reducing atmosphere, or a non-oxidizing atmosphere and at a temperature at which the graphite particles at the points in which they are in contact sinter together.

GLASS PARTICLES

The constituents of the glass material from which the dispersed particles are made can be widely varied to obtain the desired physical characteristics of the porous hollow glass microspheres. The constituents of the glass particles, depending on their intended use, can be synthetically produced glasses or naturally occurring glasses. The constituents of the glass can be selected and blended to have sufficient strength when hardened and solidified to support a substantial amount of weight.

Naturally occurring glass materials such as basaltic mineral compositions can also be used. The use of these naturally occurring glass materials can in some cases substantially reduce the cost of the raw materials used. The glass materials disclosed in the Torobin U.S. Pat. No. 4,303,431 can also be used as starting materials. The glass materials disclosed in the De Vos U.S. Pat. No. 4,059,423 can also be used in the present invention. Where appropriate the glass materials can be ground or otherwise reduced in size to obtain a desired particle size.

The heating to fire and sinter the fibers and glass particles is carried out at elevated temperatures sufficient to cause the fibers to sinter or otherwise bond to each other and the particles and the particles to sinter together at their points of contact and will depend on the properties of the particular fiber and glass particle material used.

METAL PARTICLES

The process of the present invention can be used to form fiber reinforced hollow microspheres from dispersed metal particles such iron, steel, nickel, gold, copper, zinc, tin, tungsten, lead, aluminum and magnesium and the like, and mixtures thereof. The metals disclosed in the Schmitt U.S. Pat. No. 3,264,073 and in Farnand U.S. Pat. No. 3,674,461 can be used as starting materials in the present invention.

Where appropriate, the metals can be ground or otherwise reduced in size to obtain a desired particle size.

The heating to fire and sinter the fibers and metal particles is carried out at elevated temperatures sufficient to cause the fiber to sinter or otherwise bond to each other and to the particles and the particles to sinter together at their points of contact and will depend on the properties of the particular metal fibers and metal particles used. Where certain metal materials are used as the dispersed particles the firing and sintering step can be carried out in a reducing or non-oxidizing atmosphere.

METAL GLASS PARTICLES

The term metal glass(es) as used herein is intended to mean the metal alloy materials and compositions which on rapid cooling from a temperature above their liquids temperature to a temperature below their glass temperature can form amorphous solids.

The term liquids temperature as used herein is defined as the temperature at which the liquid and crystal phases of a metal alloy composition can exist in equilibrium, that is the temperature at which the crystalline phase can first appear when the liquid is cooled.

The term glass temperature as used herein is defined as the temperature at which the configuration of the metal alloy atoms become frozen in an amorphous solid state.

Many of the known metal glass alloy compositions have liquidus temperatures within the range of 900° C. to 1200° C. and glass temperatures within the range of 300° C. to 500° C. depending on the constituents of the compositions.

There are a wide variety of metal glass allow compositions which can be used in accordance with the process of the present invention to make fiber reinforced hollow porous metal glass microspheres. The metal glass alloys compositions have been broadly described as (1) metal-metalloid alloys, (2) transition metal alloys and (3) simple metal alloys. The known metal glass alloy compositions include precious metal alloys, alkaline earth metal alloys, rare earth metal alloys and actinide metal alloys.

The dispersed metal glass particles can also be made from the metal glass alloy materials disclosed in the Torobin U.S. Pat. No. 4,415,512.

Where appropriate the metal glass materials can be ground or otherwise reduced in size to obtain the desired particle size.

The hardened fiber reinforced hollow green microspheres obtained from the blowing step are subsequently heated to a temperature sufficiently high to fire and sinter or otherwise bond the fibers to each other and to the particles and to sinter the metal glass particles together.

The metal glass microspheres can, for example, be rapidly heated to temperatures to fire and sinter the fibers and particles, followed by rapid quenching in a manner which avoids devitrification.

PLASTIC FIBERS

The plastic or organic resin materials that can be used are those disclosed in Torobin U.S. Pat. No. 4,303,603. Other plastic materials that can be used are nylon, latex particles and aqueous dispersions of TEFLON (PTFE). Plastic particles of the desired particle size can, for example, be obtained by comminutting the plastic material or otherwise treating the plastic material to reduce its size. The heating to fire and sinter or otherwise bond the fibers to each other and to the particles and to sinter the plastic particles is carried out at temperatures below the decomposition temperatures of the fibers and plastic particles and is carried out at elevated temperatures sufficient to cause the fibers and particles to bond and/or sinter together at their points of contact and will depend on the properties of the fibers and plastic particles used.

CONTINUOUS LIQUID PHASE

The continuous liquid phase can be aqueous or non-aqueous. The continuous liquid phase can act as a solvent for one or more of the active ingredients, for example, the binder material, the surface active agent and dispersing agent.

The aqueous continuous liquid phase can comprise water and/or water and water soluble solvents. The aqueous continuous liquid phase composition can comprise binder materials which include acrylic polymers, acrylic polymer emulsions, ethylene oxide polymer, hydroxethyl cellulose, methyl cellulose, polyvinyl alcohol and xanthan gum. (See, for example, binders disclosed in Callahan, et al. U.S. Pat. No. 3,538,571.)

The non-aqueous continuous liquid phase can comprise organic solvents such as acetone, ethyl alcohol, benzene, bromochloromethane, butanol, diacetone, ethanol, isopropanol, methyl isobutyl ketone, toluene, trichloroethylene and xylene.

The non-aqueous continuous liquid phase can comprise binder materials which include cellulose acetate, butyrate resin, nitro cellulose, petroleum resins, polyethylene, polyacrylate esters, polymethyl methacrylate, polyvinyl alcohol, polyvinyl butyral resins, and polyvinyl chloride. (See, for example, binder materials disclosed in Park U.S. Pat. No. 2,966,719; Pauley, et al. U.S. Pat. No. 3,324,212; and Kappes, et al. U.S. Pat. No. 3,740,234.)

Thermoplastic organic binder materials that can be used are polyvinyl resins, e.g., polyvinyl alcohol (water- or organic solvent-soluble), polyvinyl chloride, copolymers of vinyl chloride and vinyl acetate, polyvinyl butyral, polystyrene, polyvinylidene chloride, acrylic resins such as polymethyl methacrylate, polyallyl, polyethylene, and polyamide (nylon) resins.

Thermosetting resin organic binder materials that can be used are those in the thermoplastic water- or organic solvent-soluble stage of partial polymerization, the resins being converted after or during formation of the microspheres into a more or less fully polymerized solvent-insoluble stage. Other useful resins are alkyd, polysiloxane, phenol-formaldehyde, urea-formaldehyde and melamine-formaldehyde resins.

The selection of a particular thermoplastic, thermosetting or photopolymerizable binder material will depend to some extent on the solubility or dispersibility of the particular binder material in the aqueous or non-aqueous continuous phase that is to be used. Further, certain binder materials, e.g., methyl cellulose can also function as a film stabilizing agent.

FILM STABILIZING AGENTS

The fiber and dispersed particle composition may contain a natural film stabilizing agent, e.g., a surface active film stabilizing agent, or where the composition exhibits insufficient microsphere wall film stability, a film stabilizing agent can be added. The conventionally used foam stabilizing agents can also be used as film stabilizing agents.

A sufficient amount of film stabilizing agent is added such that when the fiber and dispersed particle composition is blown to form the microsphere a thin stable film is formed which allows the blowing and stretching of the film without breaking and allows the formation and detaching of the hollow microsphere. The film stabilizing agent allows sufficient time for the surface tension properties of the continuous phase of the fiber and dispersed particle composition to cause the microspheres to seek the smallest surface area, i.e., to form a spherical shape.

Film stabilizing agents such as colloidal particles of insoluble substances and viscosity stabilizers can be added to the dispersed particle composition. These types of additives can effect the viscosity of the surface film of the wall of the microsphere to stabilize the film during microsphere film wall formation. A surface active film stabilizing agent suitable for use in an aqueous continuous phase composition is lauramide diethanolamine. Anionic surface active agents such as lauryl sulfate, sodium lauryl sulfate, and ammonium lauryl sulfate can also be used. Other film stabilizing agents that can be used are diethanolamide, dihydroxy ethyl lauramide and lauric diethanolamide. The film stabilizing agent can in certain compositions also function as a dispersing agent.

DISPERSING AGENTS

For ease of handling and for maintaining the fibers and the dispersed particles, particularly fibers longer than ten microns and particles above 0.1 to 1.0 microns in size, in a stable dispersion a dispersing agent is usually added.

When the fibers are longer than ten microns and/or the particles are greater than 0.1 micron in size there is a natural tendency for the fibers and particles to separate out of the continuous phase and a dispersing agent and/or continuous stirring of the dispersed particle composition is or are required up until just before the blowing of the hollow microspheres is carried out.

A sufficient amount of dispersing agent is added such that the fibers and dispersed particles form a stable dispersion for a period long enough to blow the microspheres and for the microspheres to form hardened fiber reinforced hollow green microspheres.

Dispersing agents that are suitable for use with aqueous continuous liquid phase compositions are the commercially available sodium alkyl and sodium aryl sulfonic acids. Another dispersing agent that can be used is sold undere the trade name Darvan-7 which is a sodium polyelectrolyte, and is available from R. T. Vanderbilt Co., 230 Park Avenue, New York, N.Y. 10017. Organic carboxylic acids and organic polycarboxylic acids, e.g., citric acid, can be added to maintain a desired pH, and function as dispersing agents.

Dispersing agents that are suitable for use with non-aqueous, e.g., organic solvent, continuous liquid phase compositions are generally those used in the ceramic industry, e.g., fatty acids (glyceryl tri-oleate), Menhaden Fish Oil (Type Z-3, sold by Jesse Young, Co.) and the commercially available benzene sulfonic acid surfactants.

The dispersing agents can also in some cases, depending on the constituents of the dispersed particle composition, function as the film stabilizing agent.

DESCRIPTION OF THE HOLLOW MICROSPHERES

The fiber reinforced hollow green microspheres and fiber reinforced hollow porous microspheres made in accordance with the present invention can be made from a wide variety of film forming fiber and dispersed particle compositions, particularly ceramic fibers, glass fibers, metal and metal glass fibers and plastic fibers and dispersed ceramic, glass, metal, metal glass and plastic particles and mixtures thereof. The fiber and dispersed particle compositions comprise an aqueous or non-aqueous continuous liquid phase and have the necessary viscosities when being blown to form stable films. The hollow microsphere stable film wall after the microsphere is formed rapidly changes from liquid to solid to form fiber reinforced hollow green microspheres. The fiber reinforced hollow green microspheres can be substantially spherical in shape and can be substantially uniform in diameter and wall thickness and can have fibers uniformly dispersed in the walls of the microspheres.

The fiber reinforced hollow green microspheres as they are being formed and/or after they are formed can have a portion of the continuous liquid phase removed from the fibers and dispersed particle composition from which the microspheres were formed. The removal of continuous liquid phase can act to bring the fibers and dispersed particles closer together and into point to point contact with each other. The fibers and dispersed particles can then link up with each other to form a rigid or relatively rigid lattice work of fibers and dispersed particles which fibers and particles lattice work with the binder (if one is used) and continuous liquid phase (that remains) comprise the fiber reinforced hollow green microspheres.

The fiber reinforced hollow green microspheres are free of any latent solid or liquid blowing gas materials or latent blowing gases. The walls of the hollow green microspheres are free or substantially free of any holes, relatively thinned wall portions or sections, trapped gas bubbles, or sufficient amounts of dissolved gases to form bubbles.

The term "latent" as applied to latent solid or liquid blowing gas materials or latent blowing gases is a recognized term of art. The term latent in this context refers to blowing agents that are present in or added to glass, metal and plastic particles. In the prior art processes the glass, metal and plastic particles containing the "latent blowing agent" are subsequently heated to vaporize and/or expand the latent blowing agent to blow or "puff" the glass, metal or plastic particles to form microspheres.

In applicant's invention the fiber reinforced hollow green microspheres, because the walls contain fibers and are substantially free of any holes, thinned sections, trapped gas bubbles, and/or sufficient amounts of dissolved gases to form trapped bubbles, are substantially stronger than the hollow green microspheres heretofore produced.

The fiber reinforced hollow green and fiber reinforced hollow porous microspheres contain a single central cavity, i.e., the single cavity is free of multiple wall or cellular structures. The walls of the hollow green and hollow porous microspheres are free of bubbles, e.g., foam sections.

The fiber reinforced hollow green and fiber reinforced hollow porous microspheres can be made in various diameters and wall thickness, depending upon the desired end use of the microspheres. The microspheres can have an outer diameter of 200 to 10,000 microns, preferably 500 to 6000 microns and more preferably 1000 to 4000 microns. The microspheres can have a wall thickness of 1.0 to 1000 microns, preferably 5.0 to 400 microns and more preferably 10 to 100 microns.

When the dispersed particles are sintered, the smaller particles can be incorporated into the larger growing particles. The sintered particles in the hollow porous microspheres can be generally regular in shape and have a size of 0.1 to 60 microns, preferably 0.5 to 20 microns, and more preferably 1 to 10 microns.

The fiber reinforced porous microspheres depending on their intended use, for example, as a substrate for catalyst or separation or biotech membranes, can have diameters of 1200 to 6000 microns and wall thickness of 10 to 200 microns, and preferably diameters of 2000 to 4000 microns and wall thicknesses of 20 to 100 microns.

Where the fiber reinforced microspheres are formed in a manner such that they are connected by continuous thin filaments, that is they are made in the form of filaments microspheres, the length of the connecting filaments can be 1 to 40, usually 2 to 20 and more usually 3 to 15 times the diameter of the microspheres. The diameter, that is the thickness of the connecting filaments, can be 1/5000 to 1/10, usually 1/2500 to 1/20 and more usually 1/100 to 1/30 of the diameter of the microspheres.

The addition of the reinforcing fibers to the film forming composition acts to generally strengthen the connecting filaments.

The preferred embodiment of the invention, particularly with the ceramic materials, is to select the fiber content, the ratio of the diameter to wall thickness and the conditions of firing and sintering the fiber reinforced hollow porous microspheres such that rigid fiber reinforced hollow porous microspheres are obtained.

The fired fiber reinforced hollow porous microspheres of the present invention can have a distinct advantage of being rigid, strong and capable of supporting a substantial amount of weight. They can thus be used to make simple inexpensive self-supporting or load bearing structural systems for carrying out gas or liquid separation or pharmaceutical and chemical processes. Other uses of the hollow porous or non-porous microspheres are as filler materials and proppants.

The porosity or voids content of the walls of the hollow microspheres is dependent upon the volume percent of dispersed solids of the entire fiber and dispersed particle composition and the firing and sintering temperature.

The porosity of the walls, i.e., the void content, of the fiber reinforced hollow fired microspheres can be 5% to 45%, preferably 15% to 35% and more preferably 20% to 30% by volume of the microsphere wall.

The fiber reinforced hollow microspheres produced using the transverse jet embodiment are substantially spherical and have substantially uniform diameters and wall thickness.

The fiber reinforced hollow microspheres that are produced without the use of an external fluctuating pressure field, e.g., without the use of the transverse jet entraining fluid, can be substantially spherical and can have substantially uniform diameters or they can have thickened wall portions on opposite sides of the microspheres at the points at which the filaments are connected. The thickness of the thickened portions depends in part on the viscosity of the dispersed particle composition, the rate of hardening, the distance away from the coaxial blowing nozzle when they harden and the ability of the surface tension properties of the dispersed particle composition to absorb and distribute in the wall of the microsphere the portions of the dispersed particle composition that form the filaments.

The preferred fiber reinforced hollow microspheres are the substantially spherical microspheres. However, in some applications the hollow microspheres with the thickened wall portions can also be used. The cross section of the microsphere other than the thickened wall portion section is substantially spherical and of substantially uniform wall thickness. All the microspheres produced under a given set of operating conditions and dispersed particle composition constituents are substantially the same in sphericity, wall thickness, void content and void distribution. A specific advantage of the process is that in the production of hollow microspheres, the preceeding and the following microspheres that are produced are substantially the same size and shape.

The lower viscosity dispersed particle compositions tend to produce the more spherical microspheres and the higher viscosity dispersed particle compositions tend to produce microspheres with thickened wall portions at opposite ends of the hollow microspheres.

The fiber reinforced hollow porous microspheres produced in accordance with the present invention, depending in part on the volume percent fibers and fiber diameter and length, on the dispersed particle size, e.g., 0.1 to 3.0 microns, and dispersed particle size distribution, volume percent dispersed solids used and firing temperatures, can contain interconnecting voids or channels between the sintered particles in which the distance between particles, can be, for example, 1 to 5 microns. In order to obtain a more controlled and more uniform pore size the hollow porous microspheres can be treated to fill or partially fill and seal the interconnecting voids in the walls of the microspheres with a sol gel, i.e., a dispersed particle composition of colloidal size particles dispersed in a liquid phase. The hollow microspheres are again fired to sinter the colloidal size particles in the interconnecting voids. The colloidal size particles on firing link up to form a rigid latticework of particles across the interconnecting voids, sinter to the surface of the particles forming the interconnecting voids and the firing removes the liquid phase from the colloidal dispersed particles.

The forming of a porous rigid latticework of sintered colloidal size particles in the interconnecting voids changes the relatively large irregular pore size of the interconnecting voids to relatively uniform size micro pores of the sintered colloidal size particles.

Without intending to be limiting but rather to be used as a point of reference the following Table III provides exemplary relationships between the outer diameters of the microspheres, microsphere wall thickness, macro particle size (if used), fiber diameter and length, dispersed particle size, and ratio of the microsphere wall thickness to the outside diameter of the microsphere.

TABLE III

|  | Broad | Preferred | More Preferred |
|---|---|---|---|
| Diameter (microns) | 200 to 10,000 | 500 to 6000 | 1000 to 4000 |
| Wall thickness (microns) | 1.0 to 1000 | 5.0 to 400 | 10 to 100 |
| Fiber diameter (microns) | 0.5 to 10 | 0.5 to 5.0 | 0.5 to 3 |
| Fiber length (microns) | 2 to 500 | 5 to 100 | 5 to 20 |
| Dispersed particles (microns) | 0.005 to 60 | 0.05 to 20 | 0.1 to 10 |
| Macro particles (microns) | 1.0 to 1000 | 5.0 to 400 | 10 to 100 |
| Ratio of Wall thickness to outside microsphere diameter | 1:4 to 1:500 | 1:10 to 1:300 | 1:20 to 1:200 |
| Ratio D/L (fibers) | 1:3 to 1:100 | 1:5 to 1:50 | 1:10 to 1:20 |
| Ratio fiber length to microsphere wall thickness | 1:10 to 10:1 | 1:5 to 5:1 | 1:5 to 2:1 |

In certain embodiments of the invention, for example, where the fiber reinforced hollow microspheres are used as catalyst supports or to contain catalyst, in biotech processes, in chemical separation processes and as filler materials, the hollow microspheres can have the dimensions shown in the following Table IV.

TABLE IV

|  | Preferred | More Preferred |
|---|---|---|
| Diameter (microns) | 1200 to 6000 | 2000 to 4000 |
| Wall thickness (microns) | 10 to 200 | 20 to 100 |
| Fiber diameter (microns) | 1 to 3 | 1 to 2 |
| Fiber length (microns) | 5 to 20 | 10 to 20 |
| Dispersed particles (microns) | 0.05 to 10 | 0.1 to 5 |
| Macro particies (microns) | 10 to 200 | 20 to 100 |
| Ratio of wall thickness to outside microsphere diameter | 1:10 to 1:300 | 1:50 to 1:200 |
| Dispersed particles (vol. %) | 20 to 70 | 40 to 60 |
| Macro particles (vol. % dispersed particles) | 1 to 10 | 2 to 6 |

When use as proppants the fiber reinforced hollow microspheres can advantageously have diameters of 500 to 2000 microns and wall thickness of 50 to 800 microns and preferably can have diameters of 600 to 1000 microns and wall thickness of 100 to 300 microns, respectively.

In a preferred embodiment of the invention alumina ($Al_2O_3$) having a particle size of 0.1 to 3.0 microns is the dispersed particle. Illustrative aqueous alumina dispersed particle compositions are given in the following Table V.

TABLE V

| Material | Function | Weight Percent |
|---|---|---|
| Silicon carbide fibers (Silicon carbide) | Increase tensile strength (Volume %) | 12–16 (6–8)* |
| Alumina (0.1 to 3.0 microns) (Alumina) | Dispersed particle (Volume %) | 70–90 (40–60) |
| Water | Continuous phase | 10–20 |
| Darvan-7 | Dispersing agent | 0.1–1.0 |
| Methyl Cellulose | Binder | 0.1–6.0 |

TABLE V-continued

| Material | Function | Weight Percent |
|---|---|---|
| Lauramide Diethanolamine | Film stabilizing agent | 0.1–1.0 |

*The silicon carbide fibers are 1 micron in diameter and 10 microns in length.

The following examples illustrate the preparation of fiber reinforced hollow dispersed particle composition microspheres in accordance with the present invention which microspheres have uniform distribution of fibers in the walls of the microspheres, have substantially uniform porosity, i.e. void content and uniform void distribution.

EXAMPLE 1

An aqueous fiber and dispersed particle composition is prepared having the following constituents in the amounts indicated.

|  | Weight Percent |
|---|---|
| Silicon Carbide Fibers[1] | 15.0 |
| (Volume Percent Silicon Carbide Fibers of System) | (12.5) |
| $Al_2O_3$ (0.10 to 3.0 microns) | 69.4 |
| (Volume Percent $Al_2O_3$ of System) | (46.8) |
| Kelzan[2] (Xanthane Gum) (Binder) | 0.16 |
| Darvan-7[3] (Dispersing Agent) | 0.30 |
| Citric Acid (Dispersing Agent) | 0.04 |
| Lauramide Diethanolamine (Film stabilizing agent) | 0.10 |
| Water | 15.0 |

[1]The fibers have a diameter of 1 micron and a length of 10 microns.
[2]Sold by Kelco Company, 20 N. Wicker Drive, Chicago, IL.
[3]Sold by R. T. Vanderbilt Co., 30 Winfield St., Norwalk, CT.

The fiber and dispersed particle compositions are prepared by weighing 11 gram of Kelzan, 22 grams of Darvan-7, 2.5 grams of citric acid and mixing them together with 1000 grams of water in a polyethylene jar. There is then added to the mixture about 1000 grams of silican carbide fibers and 4620 grams of $Al_2O_3$. The dispersion is mixed by rolling in the jar on a ball mill rack at low speeds (circumferential speed 20 cm/sec.) for two to three hours. The dispersion is then allowed to sit until any entrapped air is removed. To provide the film stabilizing agent required for microsphere film stabilization during microsphere formation, 0.1 weight percent of lauramide diethanolamine is added to the dispersion. The fiber and dispersion composition and the film stabilizing agent are mixed by rolling in the jar at slow speed, to avoid air entrainment and foam formation, for approximately one hour.

The viscosity of the aqueous dispersion is measured just prior to introducing the composition to apparatus illustrated in FIG. 3 of the drawings and is adjusted to about 75 to 100 poises. The viscosity is measured by a Brookfield rotating cylinder viscosimeter.

The apparatus used is equipped with a coaxial nozzle of 0.086 in. (2184 microns) ID for the outer nozzle and 0.060 in. OD (1524 microns) for the inner nozzle. Initial preparation consists of establishing 100 cc/min. of dry $N_2$ flow through the inner nozzle, loading the apparatus with 200 cc of the dispersed particle composition and having the inner nozzle fully downwardly extended. The apparatus is closed and pressurized to 5 to 6 psi (see FIG. 1). The microsphere blowing is initiated by slowly retracting the inner nozzle until the composition flows at an even flow rate through the coaxial nozzle and by slowing the blowing gas flow rate to 50 to 60 cc/min.

The transverse jet linear gas velocity (FIG. 3) in the area of microsphere production is maintained at a rate of 2 to 10 feet per second (0.6 to 3.0 m/sec).

The fiber reinforced microspheres are filamented, i.e. connected by continuous filaments. As the distance of the microsphere from the coaxial nozzle increases the sphere becomes more rounded and the diameter of the connecting filament is reduced to about 1/10 to 1/20 of the microsphere diameter. The microspheres are at this point a uniform distance apart of approximately 4 to 10 microsphere diameters. During the blowing of the microspheres, the connecting filaments are broken away by the lateral fluctuations of the filaments induced by the flow of the transverse jet entraining fluid. The filaments break away from the microspheres at the points of connection to form free falling microspheres interspaced with broken away filament pieces.

The downward falling microspheres are partially dried and hardened to form fiber reinforced hollow green microspheres. In this example to facilitate collection of a sample of the hollow green microspheres some are collected on a rotating disc or moving belt placed a short distance (e.g. 3 to 12 inches) below the outer orifice of the coaxial nozzle. The microspheres walls, because of the short distance they are allowed to fall, are slightly flattened at the initial point of contact with the rotating disc or moving belt. In order to obtain substantially spherical microspheres additional drying time can be provided by allowing them to drop in a drying tower a sufficient distance, e.g. 6 to 16 feet, for them to become sufficiently hardened such that they are not deformed on contact. The fiber reinforced hollow green microspheres can also be collected in water, on an air cushion or fluidized bed, and can be heated and dried to further strengthen them prior to processing them to the firing step.

The fiber reinforced hollow green microspheres are fired and sintered at a temperature of about 1550° to 1650° C. for about one to three hours under conditions such that the continuous liquid phase and binder are removed without cracking the walls of the microspheres. The fired fiber reinforced microspheres are examined and are found to have substantially uniform diameters of about 2000 to 4000 microns and to have thin walls that are of substantially uniform thickness of about 20 to 30 microns and have uniform distribution of fibers in the walls of the microspheres. The sphere walls have a porosity of about 25 to 30% and uniform void content and uniform distribution of the interconnecting voids in the walls.

The surface of the fiber reinforced microspheres appear smooth and of relatively high strength.

EXAMPLE 2

The procedure of Example 1 is followed with the exception that the silicon carbide fibers have a one micron diameter and a twenty micron length, that the transverse jet of the FIG. 3 embodiment is not used and the inner coaxial nozzle $N_2$ gas flow is maintained at about 20 to 30 cc/minute. Fiber reinforced hollow green microspheres are formed as shown in FIG. 2 which at a distance of two to three feet below the blowing nozzle are evenly spaced apart. The filament microspheres as before are produced, but the filaments do not break away during their formation. The filaments are, however, broken away when the microspheres are collected. As before samples are collected on a rotating disc or moving belt placed a short distance (e.g. 3 to 12 inches) below the outer orifice of the coaxial blowing nozzle.

The fiber reinforced hollow green microspheres are collected and separated from the broken away filaments and are fired and sintered at about 1550° to 1650° C. for about one to three hours. The fired fiber reinforced microspheres have substantially uniform diameter of about 2500 to 4000 microns and have substantially uniform thin walls of about 30–40 microns and have fibers uniformly distributed in the wall of the microspheres. The microsphere walls have a porosity of about 15 to 20% and uniform void content and void distribution. The microspheres collected on the rotating disc are found to have slightly thickened wall portions at the points of connection of the filaments.

The microspheres are checked for crush strength and it is found that strong microspheres are obtained.

EXAMPLE 3

An aqueous dispersed particle composition is prepared having the following constituents in the amounts indicated.

|  | Weight Percent |
|---|---|
| Silicon Carbide fibers[1] | 17.8 |
| (Volume percent fibers) | (10) |
| Aluminum powder[2] (0.1 to 10.0 microns) | 59.6 |
| (Volume percent $Al_2O_3$) | (40) |
| Methocel[3] (Binder) | 0.60 |
| Darvan-7 (Dispersing Agent) | 0.30 |
| Citric Acid (Dispersing Agent) | 0.04 |
| (Film Stabilizing Agent)[4] | — |
| Water | 21.66 |

[1]Silicon carbide fibers one micron in diameter and ten microns in length from SiLag Inc., Greenville, S.C., a division of ARCO Chemicals.
[2]Aluminum powder from Aluminum Corp. of America, Pittsburg, PA.
[3]Methocel (A-15LZ), methylcellulose sold by Dow Chemical Co., Midland, Michigan.
[4]The Methocel also functions in this example as the film stabilizing agent.

The dispersed particle composition was prepared in accordance with the procedure of Example 2, modified by adding 45 grams of Methocel binder, 659 grams of fibers and 2207 grams of Aluminum powder and by pressurizing the apparatus to 15 to 20 psi. The microspheres are collected on a rotating disc or moving belt placed a short distance below the coaxial nozzle. Fiber reinforced hollow green microspheres which have slightly thickened wall portions at the points at which the filaments are attached are recovered.

The fiber reinforced hollow green microspheres are collected and fired at a temperature of 550° to 610° C. for 1 to 3 hours in reducing atmosphere. The firing is initially carried out in an oxidizing atmosphere to 350° C. to remove binder and then in a reducing atmosphere at 550° to 610° C. to sinter the Aluminum particles and bind them to the Silicon Carbide fibers.

The fired microsphere walls are examined and are found to have substantially uniform distribution of the fibers in the walls, substantially uniform porosity of 25 to 30% and substantially uniform void content and void distribution. The fired microspheres are about 2500 to 3000 microns in diameter and have an approximate 20 to 25 micron wall thickness and have substantially the same size and shape.

A section of the fiber reinforced microspheres taken at a right angle to a line drawn the axis of the points at which the filaments are attached shows that the microsphere walls are of substantially uniform diameter and substantially uniform wall thickness. A sample of the fired microspheres are checked and strong fiber reinforced hollow porous microspheres are obtained.

EXAMPLE 4

The procedure of Example 3 is repeated, except that about 2 to 4% by volume of the Aluminum powder particles are replaced with macro nylon particles. The macro nylon particles are smooth and are substantially spherical in shape, smooth surfaced and about 25 microns in diameter. During the mixing step the macro particles are distributed in the fiber and dispersed particle composition. The fiber and dispersed particle composition is as in Example 3 blown to obtain fiber reinforced hollow green microspheres. The green microspheres are collected and it is noted that there is distributed in the thin wall of the microspheres the nylon particles, i.e. the nylon particles show through the outer wall surface of the microspheres.

The fiber reinforced hollow green microspheres are slowly heated to a temperature of 550° to 610° C. to fire and sinter the dispersed aluminum particles. During the firing step the binder material and continuous phase and the nylon macro particles are removed. The firing is initially carried out in an oxidizing atmosphere to 350° C. to remove binder and macro Nylon particles and then in a reducing atmosphere to 550° to 610° C. to sinter the Aluminum particles and bind them to the Silicon carbide fibers. Fiber reinforced hollow porous microspheres about 2500 microns in diameter having thin walls of about 20 microns are obtained.

The walls of the hollow porous microspheres have fibers uniformly distributed therein, have uniform void content and have uniformly distributed voids. The walls of the microspheres also have uniformly distributed therein macro pores which extend through the walls and are about 25 microns in size.

EXAMPLE 5

An aqueous dispersed particle composition is prepared in accordance the procedure of Example 3 with a difference that Aluminum oxide fibers one micron in diameter and ten microns in length are substituted for the Silicon carbide fibers and finely divided glass particles are substituted for the Aluminum powder particles. The glass particles have a particle size distribution of 1 to 10 microns with the average particle size being 5 microns. The constituents of the composition of the glass particles, in percentages by weight are $SiO_2$—65 to 75%, $Na_2O$—11 to 14%, $CaO$—11 to 13%, $MgO$—1 to 2%, $Al_2O_3$—1.5 to 3.5%. The Aluminum oxide fibers are commercially available as Saffil fibers from Bobcock and Wilcox in Augusta, GA, and have a melting temperature of about 2000° C. The glass fibers are added to the continuous phase composition to obtaind and approximately 30 weight percent fibers, which is about 15 volume percent of Aluminum fibers. The glass particles are added to the binder and continuous phase of the dispersed particle composition in an amount to obtain approximately 45 weight percent of glass particles in the dispersion, which is about 35 volume percent of glass particles in the composition. The dispersion is mixed by rolling the jar on a ball mill rack at low speed (circumferential speed 20 cm/sec) for three hours. The composition is then allowed to sit and deair.

The water content of the dispersion is adjusted with continued mixing to obtain a viscosity of about 75 to 150 poises. The microsphere blowing is initiated as before by slowly retracting the inner nozzle until the composition flows at an even rate through the coaxial nozzle while maintaining the blowing gas flow rate at 50 to 60 cc/minute. The gas pressure above the composition in the apparatus is maintained at about 10 to 15 psi. Fiber reinforced microspheres of uniform diameter are continuously produced and at distances of about 2 to 3 feet from the coaxial nozzle are uniformly spaced apart. These microspheres as they are blown and formed are rapidly dried by contacting them with heated air at 90° C. in a tower 14 feet in height and about 6 to 12 inches in diameter. The hollow green microspheres are collected at the bottom of the tower on an air cushion, transported to a fluidized bed and further dried at a temperature of 120° to 160° C. to obtain fiber reinforced hollow green microspheres that have substantially uniform fiber distribution in the walls, that are substantially spherical and of substantially uniform diameter and high strength. The dried fiber reinforced hollow green microspheres are then fired at a temperature of 600° to 800° C. for sufficient time to sinter the glass fibers and to sinter the glass particles. During the firing step the binder material and continuous phase are removed leaving hollow porous glass microspheres of uniform diameter of about 3000 to 4000 microns diameter, having thin uniform walls of about 25 to 35 microns. The microspheres on cooling are found to be of high strength, to have about 25 to 35% porosity, to have glass fibers uniformly distributed in the walls, to have uniform void content and void distribution.

EXAMPLE 6

Fiber reinforced hollow fused porcelain microspheres are prepared from a fiber and dispersed particle composition having the following constituents in the amounts indicated:

|  | Grams |
|---|---|
| Silicon Carbide Fibers[1] | 500 |
| Feldspar[2] | 1012 |
| Kaolin[3] | 1012 |
| $Al_2O_3$[4] | 506 |
| Kelzan (Xanthan Gum) | 5.0 |
| Darvan-7 | 15.6 |
| Citric Acid | 2.5 |
| Water | 1000 |

[1] The fibers have a diameter of 1 micron and a length of 10 microns.
[2] The Feldspar is sold under the tradename Felex 100 Feldspar by the Feldspar Corporation, Spruce Run, North Carolina 22777.
[3] The Kaolin is sold under the tradename Velvacast by the Georgia Kaolin Company, P.O. Box 490, Dry Branch, Georgia 31021.
[4] The $Al_2O_3$ is sold under the tradename of Alcoa A-17 by the Aluminum Company of America, Pittsburgh, Pennsylvania.

The fiber and dispersed particle composition is formulated following the procedure of Example 1, except that the fibers, Feldspar, Kaolin an Alumina are premixed prior to adding them to the liquid phase.

The microspheres are blown also following the procedure of Example 1 to obtain filamented fiber reinforced hollow green microspheres about 2000 to 2500 microns in diameter and having a wall thickness of about 40 microns.

The filaments are removed and the fiber reinforced hollow green microspheres are fired at a temperature of 1180° to 1275° C. for a sufficient period of time to remove the continuous liquid phase to form interconnecting voids and then fuse the interconnecting voids closed, fuse the dispersed solid particles, have the interconnecting voids form bubbles and have the bubbles migrate to the microspheres wall surfaces and out of the microspheres walls.

On cooling it is found that fiber reinforced hollow fused wall porcelain microspheres of uniform diameter of 2000 to 2500 microns and uniform wall thickness are obtained. The walls of the microspheres are examined and are found to be about 20 microns thick, i.e., the walls have become about 50% thinner due to the fusion and removal of the interconnecting voids. The walls of the microspheres are examined and are found to have fibers uniformly distributed in the walls and the walls are found to be substantially free of interconnecting voids and trapped bubbles and the microspheres are found to be strong.

Fiber reinforced hollow green microspheres and fiber reinforced hollow porous microspheres an be made from ceramic, glass, metal, metal glass and plastic fibers and ceramic, glass metal, metal glass and plastic particles using the methods illustrated in the foregoing examples. The particular binder materials, film stabilizing agents and dispersing agents can be varied depending on the fiber and particles used, fiber and particle size, and the use of an aqueous or non-aqueous continuous phase.

There can be produced by following the teachings of this application and the procedures of Examples 1 to 6 fiber reinforced hollow porous and nonporous ceramic, glass, metal glass and plastic microspheres.

The fiber reinforced hollow microspheres can have added to them ceramic, glass, metal, metal glass or plastic fibers, providing that the fibers at the firing and sintering temperature are not changed in structure or chemical form and providing that they slightly soften, sinter or are otherwise bonded to each other and the particles. The fibers do not have to be made from the same material as the dispersed particles.

UTILITY

The fiber reinforced hollow porous microspheres and fiber reinforced microspheres that have had the pores sealed by heating and sintering the pores closed, or by filling the pores with an organic or inorganic sealing material can be used as proppants in gas recovery processes, as filler materials or aggregates in cement, plaster, asphalt and construction board materials.

The fiber reinforced hollow microspheres can be bonded together by sintering or fusion or fused with other materials and molded into sheets or other forms and used to make new light weight construction materials for use in new construction, including homes, factories and office buildings.

The fiber reinforced hollow microspheres may be adhered or bonded together with known resins, adhesives or binders to produce semi- or rigid cellular type materials for use in manufacturing various products or in construction.

These and other uses of the present invention will become apparent to those skilled in the art from the foregoing description and the appended claims.

It will be understood that various changes and modifications may be made in the fiber reinforced hollow microsphere invention, and that the scope thereof is not to be limited except as set forth in the following claims.

What is claimed is:

1. A method for making fiber reinforced hollow porous microspheres of 200 to 10,000 microns diameter and of 1 to 1000 microns wall thickness from a stable dispersion of a fiber and dispersed particle film forming composition, said composition comprising fibers and dispersed particles in a continuous liquid phase, wherein said fibers have a diameter of 0.5 to 10 microns and a length of 2 to 500 microns and the ratio of fiber diameter to length is 1:3 to 1:100 said method comprising feeding said fibers and dispersed particle composition and a blowing gas to a coaxial blowing nozzle, said coaxial blowing nozzle having an inner coaxial nozzle for said blowing gas and an outer coaxial nozzle for said fiber and dispersed particle composition and a coaxial blowing nozzle orifice, feeding said blowing gas to said inner nozzle, feeding said fiber and dispersed particle composition to said outer nozzle to blow and form, in the region of said coaxial blowing nozzle orifice, hollow fiber and dispersed particle composition microspheres having stable film walls, removing said hollow microspheres from the region of said coaxial blowing nozzle orifice, surface tension forces acting on said hollow microspheres to cause said hollow microspheres to form a spherical shape, treating said removed hollow microspheres to bring the fibers and dispersed particles into point to point contact and to harden them to obtain fiber reinforced hollow green microspheres, wherein said fibers are evenly distributed and are deposited between the dispersed particles to form a mat of fibers; and subjecting said fiber reinforced hollow green microspheres to a sufficiently high temperature for a sufficient period of time to remove the continuous liquid phase from the hollow green microspheres and to sinter or otherwise bond the fibers to each other and to the particles and to sinter the dispersed particles at their points of contact and to form within the walls of said hollow microspheres interconnecting voids that are continuous from the outer wall surface to the inner wall surface of the hollow microspheres, and to obtain fiber reinforced hollow porous microspheres having substantially uniform distribution of fibers in the walls, substantially uniform void content and substantially uniform distribution of the voids in the walls of the microspheres.

2. The method of claim 1 wherein the fiber reinforced hollow microspheres during their formation are subjected to an external pulsating or fluctuating pressure field having periodic oscillations said pulsating or fluctuating pressure field acting on said microspheres to assist in their formation and to assist in detaching the microspheres from said coaxial blowing nozzle orifice.

3. The method of claim 2 wherein fiber reinforced hollow porous microspheres are obtained that are substantially spherical, that have substantially uniform diameters and that have substantially uniform wall thickness.

4. The method of claim 1 wherein the fiber and dispersed particle composition has a viscosity of 10 to 600 poises.

5. The method of claim 1 wherein the fibers are ceramic fibers.

6. The method of claim 1 wherein the fibers are glass fibers.

7. The method of claim 1 wherein the fibers are metal fibers.

8. The method of claim 1 wherein the fibers are plastic fibers.

9. The method of claim 1 wherein the fibers are comprise 5.0 to 10 volume percent and the dispersed particles comprise 35 to 45 volume percent of the dispersed particle composition.

10. The method of claim 1 wherein the fibers are comprise 4 to 9 volume percent and the dispersed particles comprise 40 to 60 volume percent of the dispersed particle composition.

11. The method of claim 1 wherein the fibers have a diameter of 0.5 to 5 microns and a length of 5 to 100 microns, the dispersed particles have a particle size of 0.05 to 20 microns and the ratio of fiber diameter to length is 1:5 to 1:50.

12. The method of claim 1 wherein the dispersed particle composition comprises an aqueous continuous liquid phase.

13. The method of claim 1 wherein the dispersed particle composition comprises a nonaqueous continuous liquid phase.

14. The method of claim 1 wherein the fiber reinforced hollow porous microsphere obtained are further heated at elevated temperature to fuse the walls of the hollow microspheres and to close the pores and interconnecting voids.

15. A method for making fiber reinforced hollow porous microspheres of 200 to 10,000 microns diameter and of 1 to 1000 microns wall thickness from a stable dispersion of a fiber and dispersed particle film forming composition, said composition comprising fibers and dispersed particles in a continuous liquid phase, wherein said fibers have a diameter of 0.5 to 10 microns and a length of 2 to 500 microns and the ratio of fiber diameter to length is 1:3 to 1:100 said method comprising feeding said fibers and dispersed particle composition and a blowing gas to a coaxial blowing nozzle, said coaxial blowing nozzle having an inner coaxial nozzle for said blowing gas and an outer coaxial nozzle for said fiber and dispersed particle composition and a coaxial blowing nozzle orifice, feeding said blowing gas to said inner nozzle, feeding said fiber and dispersed particle composition to said outer nozzle to form and blow, at said coaxial blowing nozzle orifice, hollow fiber and dispersed particle composition microspheres having stable film walls, continuously feeding said fiber and dispersed particle composition to said outer coaxial nozzle while said microspheres are being formed, directing an entraining fluid at said coaxial nozzle at an angle relative to a line drawn through the center axis of said coaxial blowing nozzle, said entraining fluid passing over and around said coaxial blowing nozzle to fluid dynamically induce a pulsating or fluctuating pressure field having periodic oscillations at the opposite or lee side of the blowing nozzle in the wake of shadow of said blowing nozzle, said entraining fluid acting on the microspheres to pinch and close-off the microspheres at a point proximate to the coaxial blowing nozzle and said entraining fluid acting to detach the microspheres from the coaxial blowing nozzle and move the microspheres away from the coaxial nozzle, surface tension forces acting on said hollow microspheres to cause said hollow microspheres to form a spherical shape, treating said detached hollow microspheres to bring the fibers and dispersed particles into contact with each other and to harden the microspheres to obtain fiber reinforced hollow green microspheres, wherein said fibers are evenly distributed and are deposited between the dispersed particles to form a mat of fibers; and subjecting said hollow green microspheres to a sufficiently high temperature for a sufficient period of time to remove the continuous liquid phase from the hollow green microspheres and to sinter or otherwise bond the fibers to each other and to the particles and to sinter the dispersed particles at their points of contact and to form within the walls of said hollow microspheres interconnecting voids that are continuous from the outer wall surface to the inner wall surface of the hollow microspheres, and to obtain hollow porous microspheres that are substantially spherical, having substantially uniform diameters, substantially uniform wall thickness, substantially uniform distribution of fibers in the walls and substantially uniform distribution of interconnecting voids in the walls of the microspheres.

16. The method of claim 15 wherein the lower portion of the outer coaxial nozzle is tapered inwardly to form with the outer edge of the inner mozzle a fine gap and the fiber and dispersed particle composition is fed under pressure through said gap to form a stable thin film of film forming fiber and dispersed particle composition across the orifice of the coaxial blowing nozzle.

17. The method of claim 15 wherein said fiber and dispersed particle composition comprises a binder, film stabilizing agent and dispersing agent.

18. The method of claim 15 wherein the fiber and dispersed particle composition has a viscosity of 10 to 200 poises.

19. The method of claim 15 wherein the dispersed particles comprise ceramic particles.

20. The method of claim 15 wherein the dispersed particles comprise alumina particles.

21. The method of claim 15 wherein the fibers are ceramic fibers.

22. The method of claim 15 wherein the fibers are glass fibers.

23. The method of claim 15 wherein the fibers are metal fibers.

24. The method of claim 15 wherein the fibers are plastic fibers.

25. The method of claim 15 wherein the fibers have a diameter of 0.5 to 5.0 microns and a length of 5 to 100 microns and the dispersed particles have a particle size of 0.05 to 20 microns and the ratio of fiber diameter to length is 1:15 to 1:50.

26. The method of claim 15 wherein the fiber reinforced hollow porous microspheres obtained are 500 to 6000 microns in diameter and have a wall thickness of 5 to 400 microns.

27. The method of claim 26 wherein the fiber reinforced hollow porous microspheres obtained contain macro pores 10 to 200 microns in size distributed in the walls of said microspheres and which extend through the walls of the microspheres.

28. The method of claim 15 wherein the fiber reinforced hollow porous microspheres obtained are further heated at elevated temperature to fuse the walls of the hollow microspheres and close the pores and interconnecting voids.

29. A method for making fiber reinforced hollow green microspheres of 200 to 10,000 microns diameter and of 1 to 1000 microns wall thickness from a stable dispersion of a fiber and dispersed particle film forming composition, said composition comprising fibers and dispersed particles in a continuous liquid phase, wherein said fibers have a diameter of 0.5 to 10 microns and a length of 2 to 500 microns and the ratio of fiber diameter to length is 1:3 to 1:100 said method comprising feeding said fibers and dispersed particle composition and a blowing gas to a coaxial blowing nozzle, said coaxial blowing nozzle having an inner coaxial nozzle for said blowing gas and an outer coaxial nozzle for said fiber and dispersed particle composition and a coaxial blowing nozzle orifice, feeding said blowing gas to said inner nozzle, feeding said fiber and dispersed particle composition to said outer nozzle to blow and form, in the region of said coaxial blowing nozzle orifice, hollow fiber and dispersed particle composition microspheres having stable film walls, removing said hollow microspheres from the region of said coaxial blowing nozzle orifice, surface tension forces acting on said hollow microspheres to cause said hollow microspheres to form a spherical shape, said fiber and dispersed particle composition forming the walls of said hollow microspheres and said fibers and dispersed particles being uniformly dispersed in said continuous liquid phase, treating said removed hollow microspheres to remove a portion of the continuous liquid phase to bring the dispersed particles into point to point contact and to harden them, said fibers and dispersed particles being of sufficient size and in a sufficient amount such that the fibers and dispersed particles in the walls of the hollow microspheres link up and form a relatively rigid lattice work of fibers and dispersed particles, and obtaining fiber reinforced hollow green microspheres that have substantially uniform distribution of the fibers and dispersed particles in the walls of the microspheres.

30. The method of claim 29 wherein the fiber reinforced hollow green microspheres during their formation are subjected to an external pulsating or fluctuating pressure field having periodic oscillations, said pulsating or fluctuating pressure field acting on said microspheres to assist in their formation and to assist in detaching the microspheres from said coaxial blowing nozzle orifice.

31. The method of claim 29 wherein the lower portion of the outer coaxial nozzle is tapered inwardly to form with the outer edge of the inner nozzle a fine gap and the fiber and dispersed particle composition is fed under pressure through said gap to form a stable thin film of film forming fiber and dispersed particle composition across the orifice of the coaxial blowing nozzle.

32. The method of claim 29 wherein fiber reinforced hollow green microspheres are obtained that are substantially spherical, that have substantially uniform diameters of 500 to 6000 microns, and that have substantially uniform wall thickness of 5 to 400 microns and substantially uniform distribution of the fibers in the wall of the microsphere.

33. The method of claim 29 wherein the dispersed particles composition comprises a binder, film stabilizing agent and dispersing agent.

34. The method of claim 29 wherein the fibers have a diameter of 0.05 to 5 microns and a length of 5 to 100 microns and the dispersed particles have a particle size of 0.05 to 20 microns and the ratio of fiber diameter to length is 1:5 to 1:50.

35. The method of claim 1 for making fiber reinforced hollow porous microspheres wherein the dispersed particle composition comprises at least 2.5 volume percent of fibers and at least 30 volume percent of dispersed particles.

36. The method of claim 1 for making fiber reinforced hollow porous microspheres wherein the disperse particle composition comprises up to 15 volume percent of fibers and up to 60 volume percent of dispersed particles.

37. The method of claim 1 for making fiber reinforced hollow porous microspheres wherein said microspheres have a diameter of 500 to 6000 microns and a wall thickness of 5 to 400 microns.

38. The method of claim 11 for making fiber reinforced hollow porous microspheres wherein the dispersed particles are 0.1 to 3 microns in size.

39. The method of claim 15 for making fiber reinforced hollow porous microspheres wherein the dispersed particle composition comprises at least 2.5 volume percent of fibers and at least 30 volume percent of dispersed particles.

40. The method of claim 15 for making fiber reinforced hollow porous microspheres wherein the dispersed particle composition comprises up to 15 volume percent of fibers and up to 60 volume percent of dispersed particles.

41. The method of claim 15 for making fiber reinforced hollow porous microspheres wherein the dispersed particle composition comprises 5 to 10 percent by volume fibers and 35 to 45 percent by volume of dispersed particles.

42. The method of claim 25 for making fiber reinforced hollow porous microspheres wherein the dispersed particles are 0.1 to 3 microns in size.

43. The method of claim 29 for making fiber reinforced hollow green microspheres wherein the dispersed particle composition comprises at least 2.5 volume percent fibers and at least 30 volume percent of dispersed particles.

44. The method of claim 29 for making fiber reinforced hollow green microspheres wherein the dispersed particle composition comprises at least 15 volume percent fibers and up to 60 volume percent of dispersed particles.

45. The method of claim 29 for making fiber reinforced hollow green microspheres wherein the dispersed particle composition comprises 5 to 10 percent by volume fibers and 35 to 45 percent by volume of dispersed particles.

46. The method of claim 34 for making fiber reinforced hollow green microspheres wherein the dispersed particles are 0.1 to 3 microns in size.

* * * * *